(12) United States Patent
Barquin et al.

(10) Patent No.: US 11,311,134 B2
(45) Date of Patent: Apr. 26, 2022

(54) EASY ASSEMBLY CENTRIFUGAL JUICER

(71) Applicant: Spectrum Brands, Inc., Middleton, WI (US)

(72) Inventors: Javier Barquin, Madison, WI (US); Rolando Antonio Cavazos Jimenez, Middleton, WI (US); Joseph Krebs, Madison, WI (US); Randy Miller, Middleton, WI (US); Kroy Everett Nernberger, Madison, WI (US); James Saunders, Middleton, WI (US); Jacob Smith, Middleton, WI (US)

(73) Assignee: Spectrum Brands, Inc., Middleton, WI (US)

( * ) Notice: Subject to any disclaimer, the term of this patent is extended or adjusted under 35 U.S.C. 154(b) by 393 days.

(21) Appl. No.: 16/436,162

(22) Filed: Jun. 10, 2019

(65) Prior Publication Data
US 2019/0290046 A1 Sep. 26, 2019

Related U.S. Application Data

(62) Division of application No. 15/060,423, filed on Mar. 3, 2016, now Pat. No. 10,334,979.

(60) Provisional application No. 62/128,842, filed on Mar. 5, 2015.

(51) Int. Cl.
*A47J 19/00* (2006.01)
*A47J 19/02* (2006.01)
*A47J 19/06* (2006.01)

(52) U.S. Cl.
CPC ............ *A47J 19/027* (2013.01); *A47J 19/06* (2013.01)

(58) Field of Classification Search
CPC .................... A47J 19/02–027; A47J 19/06
USPC .................................................. 99/495, 511
See application file for complete search history.

(56) References Cited

U.S. PATENT DOCUMENTS

| 2,097,082 | A | 10/1937 | Rupert et al. |
| 3,623,523 | A | 11/1971 | Meyer et al. |
| 3,688,906 | A | 9/1972 | Ferrara |
| 4,034,664 | A | 7/1977 | Hassell |
| 4,119,542 | A | 10/1978 | Yamaoka et al. |

(Continued)

FOREIGN PATENT DOCUMENTS

| CN | 203493366 | 3/2014 |
| CN | 204105680 | 1/2015 |

(Continued)

OTHER PUBLICATIONS

Bella High Power Juicer, Model #13694 http://www.bellahousewares.com/beverages/blenders-and-juicers/juicers/stainless-steel-high-power-juicer-13694.

(Continued)

*Primary Examiner* — Michael A Laflame, Jr.
(74) *Attorney, Agent, or Firm* — Foley & Lardner LLP

(57) ABSTRACT

Systems and methods herein relate to an easy assemble centrifugal juicer. The centrifugal juicer includes a top section having a juice spout and pulp spout, wherein the top section defines a cavity with a first mating surface and a second mating surface; a strainer section having a strainer, a drive member, and a projection, the projection structured to engage with the first mating surface to couple the strainer section to the top section; and a motor housing structured to house a motor, wherein the motor is operatively coupled to a motor adapter structured to engage with the drive member.

12 Claims, 19 Drawing Sheets

(56) References Cited

U.S. PATENT DOCUMENTS

| | | | |
|---|---|---|---|
| 4,681,031 A | | 7/1987 | Austad |
| 5,222,430 A | | 6/1993 | Wang |
| 5,355,784 A | | 10/1994 | Franklin et al. |
| 6,050,180 A | | 4/2000 | Moline |
| 6,070,519 A | * | 6/2000 | Sham ................. A47J 43/044 99/348 |
| 6,862,981 B1 | | 3/2005 | Yen |
| 7,422,361 B2 | | 9/2008 | Pryor et al. |
| 8,091,473 B2 | | 1/2012 | Kim |
| 8,807,022 B2 | | 8/2014 | 8Ackus |
| D718,985 S | | 12/2014 | Yan |
| 2006/0086261 A1 | | 4/2006 | Cohen et al. |
| 2006/0153003 A1 | | 7/2006 | Sands |
| 2006/0191425 A1 | * | 8/2006 | Chang ................. A47J 19/027 99/511 |
| 2007/0107609 A1 | | 5/2007 | Darker et al. |
| 2007/0125244 A1 | * | 6/2007 | Hensel ................. A47J 19/025 99/501 |
| 2007/0261571 A1 | | 11/2007 | Esteve |
| 2011/0240782 A1 | | 10/2011 | Sands |
| 2011/0271849 A1 | | 11/2011 | Jays |
| 2012/0291638 A1 | | 11/2012 | Kim |
| 2013/0284034 A1 | | 10/2013 | Jeong et al. |
| 2015/0059597 A1 | | 3/2015 | Lee |
| 2017/0164776 A1 | | 6/2017 | Floessholzer et al. |

FOREIGN PATENT DOCUMENTS

| | | |
|---|---|---|
| EP | 0 684 000 A1 | 11/1995 |
| JP | 2001-061664 | 3/2001 |
| KR | 1020140042176 | 4/2014 |

OTHER PUBLICATIONS

Black and Decker, Model # JE2200B http://www.blackanddeckerappliances.com/products/blenders-and-juicers/juice-extractors/fruit-and-vegetable-juice-extractor-je2200b.aspx.

Bosch Multiquick Juicer, http://www.bosch-home.co.uk/products/food-preparation/juice-extractors/MES4000GB.html#tab2.

Breville Model #JE98XL http://www.brevilleusa.com/the-juice-fountain-plus-je98xl.html.

Breville, Model #800JEXL http://www.brevilleusa.com/die-cast-juice-fountain-elite.html.

Breville, Model #BJE200XL http://www.brevilleusa.com/the-juice-fountain-compact.html.

Cuisinart, Model # CJE-1000 https://www.cuisinart.com/products/juicers/cje-1000/.

Dash Model # JB001CM https://www.amazon.com/Dash-JB001CM-Premium-Juice-Extractor/dp/B007UN2OJ0/ref=sr_1_1?s=kitchen&ie=UTF8&qid=1466795888&sr=1-1&keywords=dash+premium+juicer.

European Search Report for EP Application No. 16759522.2 dated Jul. 30, 2018. 9 pages.

Hamilton Model #67608 https://www.hamiltonbeach.com/juicing-recipes-big-mouth-pro-juice-extractor-67608.html#accessories.

International Preliminary Reporton Patentability for PCT/US2016/020757 dated Sep. 5, 2017. 9 pages.

Jack Lalanne Model # JLPJBL http://www.powerjuicer.com/power-juicer-express.php#.

Juiceman Model #JM8000S https://www.amazon.com/gp/product/B00C7EO6QQ/refs9_dcacsd_bhz_bw_c_x_1r-13694.

Krups Model #ZY403851 https://www.amazon.com/ZY403851-Definitive-Stainless-Extractor-Exclusive/dp/B00SHZA4YM?ie=UTF8&*Version*=1&*entries*=0.

L'Eqip Model #306150 https://www.amazon.com/LEquip-306150-Watts-Ejection-Juicer/dp/B0000DDVN4?ie=UTF8&*Version*=1&*entries*=0.

PCT International Search Report and Written Opinion for PCT/US2016/020757 dated Jun. 22, 2016. 14 pages.

Philips Model #HR1861/00 http://www.philips.co.uk/c-p/HR1861_00/aluminium-collection-juicer.

Phillips Model #1863/01 http://www.philips.co.uk/c-p/HR1863_01/viva-collection-juicer.

T-Fal Model #ZE58131US http://www.t-falusa.com/instructions-for-use/products/Kitchen-Appliances/Electric-food-%26-juice-preparation/Juicer/Balanced-Living/csp/1500831604.

* cited by examiner

EASY ASSEMBLY CENTRIFUGAL JUICER

CROSS-REFERENCE TO RELATED APPLICATIONS

This application claims the benefit of priority as a division of U.S. patent application Ser. No. 15/060,423 filed Mar. 3, 2016, which claims priority to U.S. Provisional Patent Application No. 62/128,842, filed Mar. 5, 2015, which are incorporated by reference in their entireties.

FIELD

The present disclosure relates to juicers. More particularly, the present disclosure relates to centrifugal juicers and methods of assembly thereof.

BACKGROUND

This section is intended to provide a background or context to the disclosure recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Juicing is a process of extracting juice and related nutrients from a food product (e.g., food stuffs such as fruits, vegetables, etc.). Many people gravitate towards juicing to reap potential health benefits of obtaining juice directly from fruits and vegetables. Currently, there are several types of juicers on the market, including masticating juicers and centrifugal juicers. Masticating juicers utilize a crushing and pressing operation to extract juice while centrifugal juicers utilize a high speed rotary motion (i.e., centrifugal force) to extract the juice from a product. Due to the crushing and pressing operation, masticating juicers tend to extract juice slower than centrifugal juicers.

While centrifugal juicers provide the advantage of quickly extracting the juice, centrifugal juicers can be confusing to assemble and difficult to clean due to the relatively high number of components that must typically be disassembled/reassembled for operating and cleaning the juicer. Currently, known centrifugal juicers generally have at least five separate parts. These centrifugal juicers typically require four steps to make the unit operational: place the juice/pulp catcher on the motor housing, attach the strainer basket, attach the top/spout section, and latch the safety mechanism. The relatively high number of components and steps, especially the particular order of those steps, make the current centrifugal juicers complicated and difficult to use for many users. Furthermore, the relatively high number of components makes cleaning and re-assembly overly complicated and cumbersome for many users. Yet another disadvantage of know commercial centrifugal juicers is that each interface between separate components creates a source of wear, misalignment, damage and represents a potential failure mode for the appliance. The greater number of separate components, the greater the number of potential failure modes.

SUMMARY

One embodiment relates to a centrifugal juicer. The centrifugal juicer includes a top section having a juice spout and pulp spout, wherein the top section defines a cavity with a first mating surface and a second mating surface; a strainer section having a strainer, a drive member, and a projection, the projection structured to mate with the first mating surface to couple the strainer section to the top section; and a motor housing structured to house a motor, wherein the motor is operatively coupled to a motor adapter structured to selectively engage with the drive member.

Another embodiment relates to a method of providing a centrifugal juicer. The method includes providing a top section of the centrifugal juicer, the top section defining a cavity having a mating feature and a lower opening; providing a strainer section of the centrifugal juicer, the strainer section having a mating feature and a drive member; and providing a motor housing of the centrifugal juicer having a motor and defining a coupling structure that selectively engages with the drive member.

Still another embodiment relates to a method of assembling a centrifugal juicer. A user may assemble the centrifugal juicer by inserting the strainer section into the lower opening of the cavity defined by the top section; upon insertion, the user may mate the top section with the strainer section to couple the top section to the strainer section; and, subsequently, the user may mate the coupled top section and strainer section with the motor housing.

Yet another embodiment relates to a method of assembling a centrifugal juicer. The method includes providing a top section, a strainer section, and a motor housing of the centrifugal juicer; coupling the strainer section with the motor housing to engage a strainer drive member of the strainer section; and mating the top section with the coupled strainer section and motor housing, wherein mating the top section to the coupled strainer section and motor housing activates an interlock device to permit power to a motor in the motor housing.

A further embodiment relates to a method of assembling a centrifugal juicer. The method includes providing a top section, a strainer section, and a motor housing of a centrifugal juicer; and, performing one of: inserting the strainer section into a lower opening of a cavity defined by the top section, or coupling the strainer section with the motor housing to engage a strainer drive member of the strainer section. According to one embodiment, when the insertion process is performed, the method further includes mating the top section with the strainer section to couple the top section to the strainer section, and mating the coupled top section and strainer section with the motor housing to form the centrifugal juicer. According to another embodiment, when the coupling process is performed, the method further includes mating the top section with the coupled strainer section and motor housing to form the centrifugal juicer.

DETAILED DESCRIPTION

Figure 1:
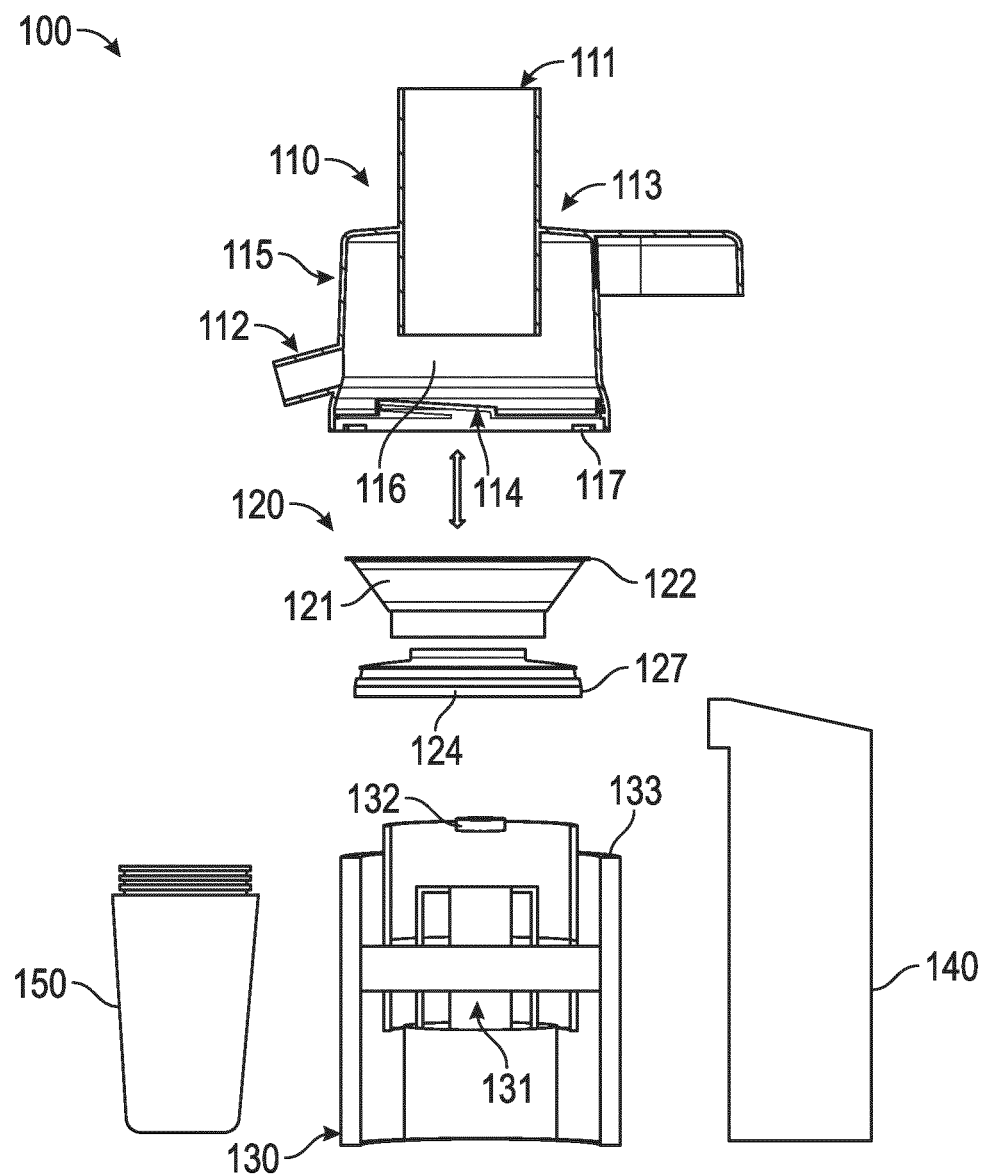
FIG. 1 is a cross-sectional front assembly view of a centrifugal juicer, according to an exemplary embodiment.

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring to the Figures generally, a centrifugal juicer and method of assembly thereof are shown according to various embodiments disclosed herein. According to the present disclosure, a top section of a centrifugal juicer includes a food inlet spout, a pulp exit spout, and a juice spout. A middle section or strainer section of the centrifugal juicer includes a strainer, a cutting member, and an attachment device for coupling the middle section to the top section. The bottom section or motor housing of the centrifugal juicer houses a motor for the centrifugal juicer. According to the present disclosure, the top section is a unitary assembly, the strainer section is a unitary assembly, and the motor housing is a unitary housing (i.e., single piece components). Therefore, the centrifugal juicer of the present disclosure has only three separable components. The relatively low number of components reduces the complexity, permits easier cleaning, and reduces the number of potential failure modes relative to conventional centrifugal juicers.

To assemble the centrifugal juicer of the present disclosure, the strainer section is attached to a bottom or floor part of the top section. Then, the combined top and strainer sections are attached to the motor housing. An interlock device (e.g., safety mechanism, etc.) is activated upon proper attachment of the combined top and strainer sections to the motor housing. Activation of the interlocking device permits power to the motor to operate the centrifugal juicer. As described above, conventional juicers typically require at least four steps before the centrifugal juicer is operational. According to the present disclosure, the centrifugal juicer is assembled in two steps. This reduction in steps saves time, reduces complexity, improves reliability and as a result, may be more appealing to users and consumers over conventional centrifugal juicers. Furthermore, by including activation of the interlocking device during engagement of the combined top section and strainer section with the motor housing, the use of external latches that are typically found in conventional centrifugal juicers are eliminated. These and other features and advantages of the centrifugal juicer of the present disclosure are described more fully herein.

Figure 2:
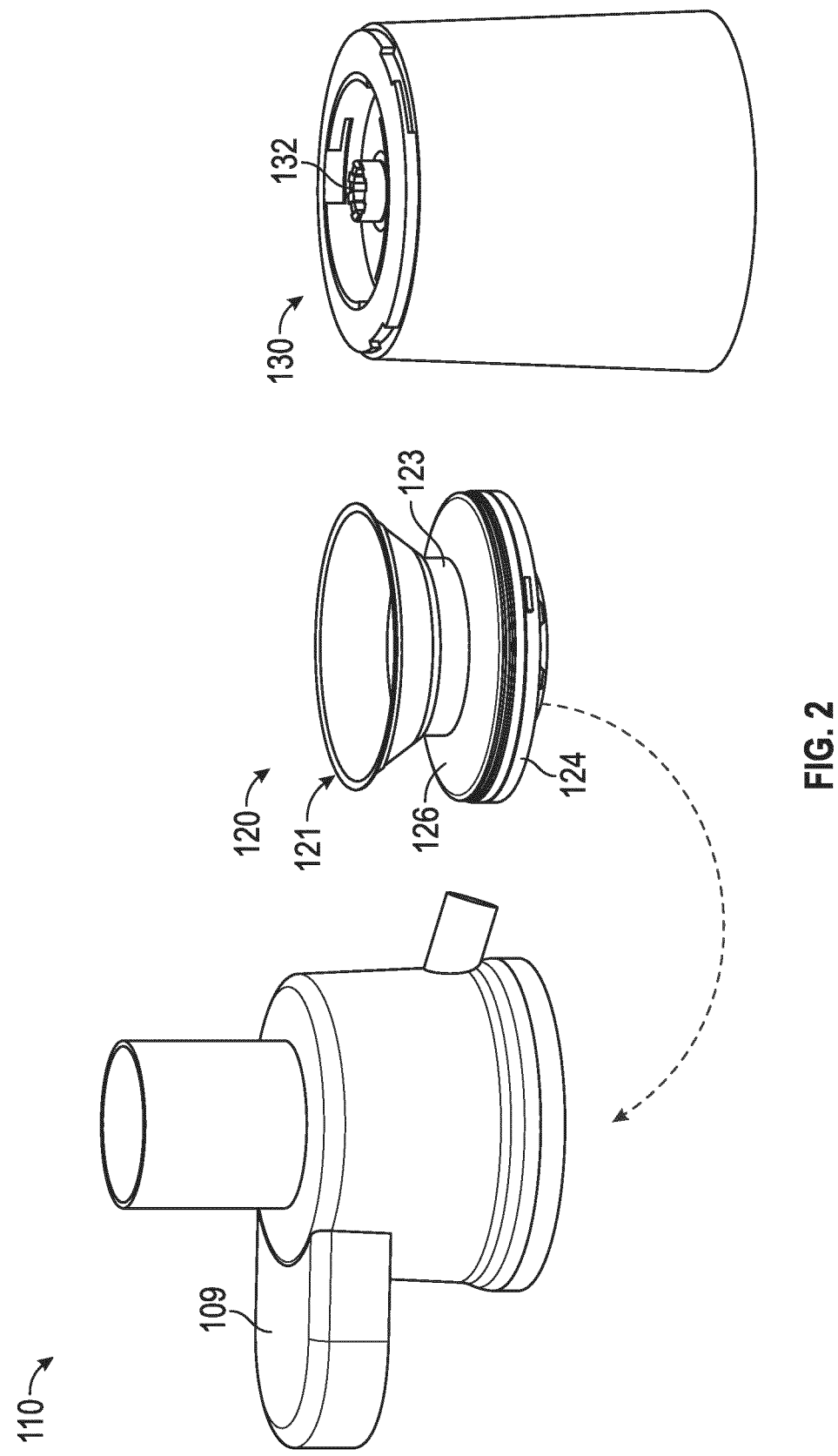
FIG. 2 is a front assembly view of a centrifugal juicer with the juicer and pulp containers removed, according to an exemplary embodiment.

Referring now to FIGS. 1-2, a cross-sectional front assembly view of a centrifugal juicer (FIG. 1) and a front assembly view of a centrifugal juicer with the juicer and pulp containers removed (FIG. 2) are shown, according to exemplary embodiments. Generally speaking, the centrifugal juicer 100 is structured to receive food stuffs (e.g., fruit, vegetables, etc.), cut the food stuffs using a cutting member, and extract juice from the cut-up produce (e.g., from the pulp and flesh of the produce). The juice is extracted using a centrifugal force to separate the juice from the solid parts of the cut-up food stuffs. The extracted juice is provided to a container for consumption while the remaining, substantially solid parts of the food stuffs are provided to a separate pulp container. The remaining solid parts of the food stuffs may be discarded and/or used for other purposes (e.g., as part of a recipe, etc.).

The centrifugal juicer 100 generally includes three main components: a top section 110, a strainer section 120, and a motor housing 130. When assembled, the top section 110 is in fluid communication with pulp and juice containers 140, 150 respectively (e.g., holders, collectors, receptors, jars, etc.). The juice container 150 and pulp container 140 may be of any shape and size. As shown, the pulp container 140 is positioned external of the three main components of the centrifugal juicer 100. In other embodiments, the centrifugal juicer 100 may be structured to include an integrated pulp container (i.e., there is no external container like shown in FIG. 1). In this configuration, the top section 110 may be expanded to define a separate volume for the separated pulp (i.e., the substantially solid cut-up food stuffs). Thus, despite the Figures and description herein being directed to a centrifugal juicer with an external pulp container, this structure is not meant to be limiting as the same or similar principles, structures, and methods described herein may be used with centrifugal juicers with integrated pulp containers. Therefore, both variations are intended to fall within the spirit and scope of the present disclosure.

Figure 3:
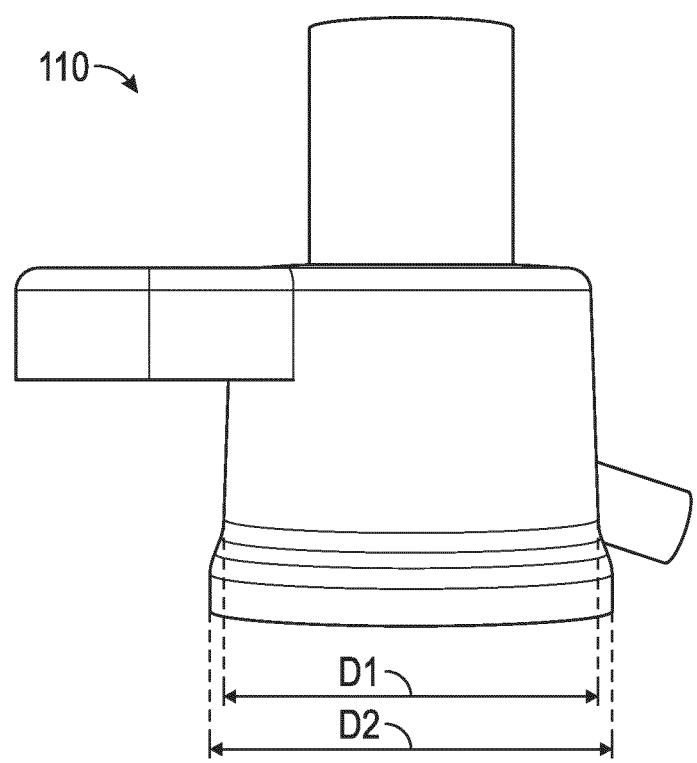
FIG. 3 is a front view of a top section of a centrifugal juicer, according to an exemplary embodiment.
Figure 4:
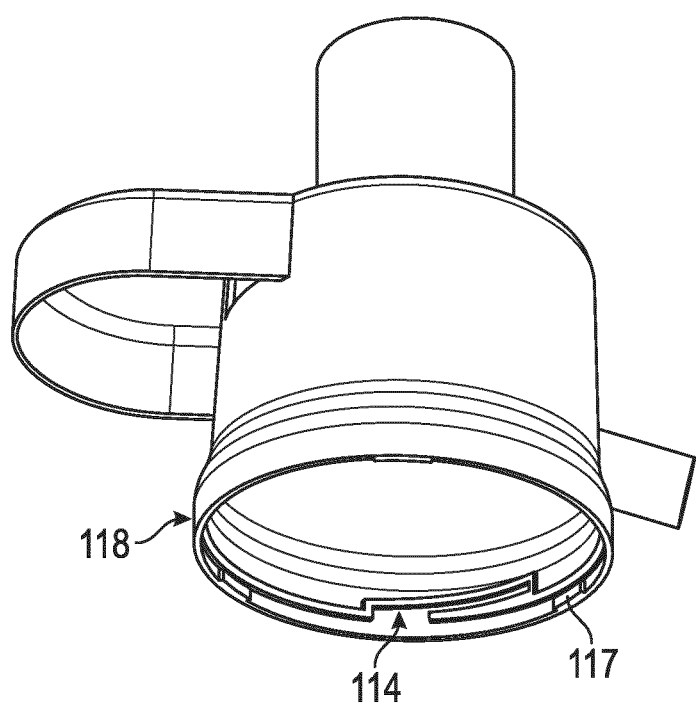
FIG. 4 is a bottom perspective view of the top section of FIG. 3, according to an exemplary embodiment.

Before turning to the process of assembling the centrifugal juicer 100, each main component and features thereof are explained. Accordingly, referring now to FIGS. 1-4, the top section 110 is shown according to various exemplary embodiments. As shown, the top section 110 includes a housing 115 (e.g., body, bowl, drum, etc.) that defines a cavity 116. The cavity 116 is in food stuff receiving communication with a food inlet 111 (e.g., a food inlet spout, chute, entry, etc.) of the housing 115. The housing 115 also includes a juice spout 112 (e.g., pipe, channel, etc.) extending from the housing 115. The juice spout 112 is structured to guide the extracted juice to the juice container 150. While the juice spout 112 is shown as a tube extending from the housing 115, any shape and structure may be used for the juice spout 112. For example, in other embodiments, the housing may define an opening or aperture that provides the extracted juice. As shown, the housing 115 also defines a pulp exit 113. The pulp exit 113 is structured to provide pulp and other substantially solid parts of the food stuffs to the pulp container 140. While shown as an opening, the pulp exit 113 may have any type of shape (e.g., a tube extending from the housing that is received by the pulp container 140, etc.). In FIGS. 2-4, a cover 109 is shown extending from the housing 115. The cover 109 is structured to couple the top section 110 to the pulp container 140. The cover 109 may also substantially prevent spillage from the transfer of the substantially solid food stuffs in the cavity 116 to the pulp exit 113 to the pulp container 140. In operation, the centrifugal force from the cutting member 125 (see FIG. 10) causes the cut-up and substantially solid food stuffs (e.g., pulp) to rise above the rim 122 of the strainer section 120 (see FIGS. 6-7) and into the pulp exit 113 to the pulp container 140.

As described more fully herein, the housing 115 also includes an attachment mechanism (i.e., a mating feature) for coupling the top section 110 to the strainer section 120. As shown in FIGS. 1-2 (the dashed line in FIG. 2 and the double arrow line in FIG. 1), the strainer section 120 is inserted into the bottom (i.e., opening 118) of the top section 110 to couple the strainer section 120 to the top section 110. In the embodiment shown (see FIG. 4), the housing 115 defines a first mating surface, shown as first ridge 114 (e.g., threads, projections, etc.) that are structured to rotatably engage with complementary projections 127 of the strainer section 120. As described herein, in other embodiments, any other type of attachment mechanism or mating feature may be utilized to couple or mate the top section 110 to the strainer section 120 (e.g., a snap engagement, an interference relationship, etc.).

As shown in FIG. 4, the housing 115 also defines a second mating surface, shown as second ridge 117 (e.g., thread(s), ledge, projection, etc.). The second mating surface corresponds with a second mating feature for the housing 115, where the second mating feature is structured to selectively permit mating or coupling of the housing 115 to the motor housing 130. In the example shown, the second ridge 117 is positioned below the first ridge 114 (i.e., closer to the lower opening 118 of the cavity 116 where the strainer section 120 is inserted). In operation, the strainer section 120 engages with the first ridge 114 to couple the strainer section 120 to the top section 110. However, a lower part of the housing 115 where the second ridge 117 is positioned still remains exposed when the top section 110 is coupled to the strainer section 120. In operation, this exposed part slides over the top member 137 of the motor housing 130, such that the second ridge 117 is able to engage with the groove 138 of the motor housing 130 to couple the top section 110 to the motor housing 130.

As described herein, the strainer section 120 also includes a sealing member 126 that engages with the side walls of the cavity 116 to form a substantially fluid tight connection. According to one embodiment, the portion of the cavity 116 (i.e., where the first ridge 114 is located) that receives the strainer section 120 is of a relatively smaller diameter (D1 in FIG. 3) than the diameter (D2 in FIG. 3) portion of the cavity 116 that slips over the top member 137 (i.e., where the second ridge 117 is positioned). In this regard, the strainer section 120 may be inserted and removed from the top section 110 without interfering with the mechanism used to couple the top section 110 to the motor housing 130. In other embodiments, various other types of attachment, mating, or coupling mechanisms may be utilized to couple the top section 110 to the strainer section 120 and to couple the top section 110 to the motor housing 130.

As shown, the housing 115 is generally cylindrical in shape. This is for illustrative purposes only and not meant to be limiting. In other embodiments, any shape of the housing 115 may be used. Similarly, other shapes and relative sizes may also be used with the food inlet 111 and juice spout 112, such that the cylindrical shapes depicted in the Figures are not meant to be limiting.

According to the present disclosure, the top section 110 is of unitary construction (e.g., a one-piece component). Advantageously, the unitary construction of the top section 110 reduces the number of components included with the centrifugal juicer 100. Furthermore and as described more fully herein, due to this unitary construction, the steps used to assemble the centrifugal juicer 100 may be reduced relative to conventional centrifugal juicers. This feature may reduce complexity, reduce the number of components for cleaning, and thus increase ease of use of the centrifugal juicer 100 of the present disclosure. Moreover, by integrating the components into a unitary component, a reduction in failure modes is achieved due to the relatively fewer number of parts that could fail as compared to conventional centrifugal juicers. In turn, this increases the reliability of the centrifugal juicer 100 of the present disclosure relative to conventional centrifugal juicers.

As mentioned above and shown in regard to FIGS. 1-2, the centrifugal juicer includes three main components: the top section 110, the strainer section 120, and the motor housing 130. Accordingly, referring now to FIGS. 5-18, the features of the strainer section 120 are shown according to various exemplary embodiments.

As described herein, in one embodiment, the strainer section 120 may include one mating surface for mating or coupling to the top section 110. This structure corresponds with the strainer section 120 first being inserted and coupled to the top section 110 followed by that assembly mating with the motor housing 130. In another embodiment and as also further described herein, the strainer section 120 may have two mating surfaces: one for the top section 110 and one for the motor housing 130. This structure corresponds with the strainer section 120 and motor housing 130 being coupled or mated first, followed by the top section 110 mating with that assembly. In other embodiments, the strainer section 120 may always or substantially always include two mating surfaces even though only one mating surface is used as in the first described embodiment. Advantageously, this structure may provide modularity for the strainer section 120 and centrifugal juicer 100 such that each method of assembly may be readily utilized depending on the preference of the assembler of the juicer 100.

Figure 5:
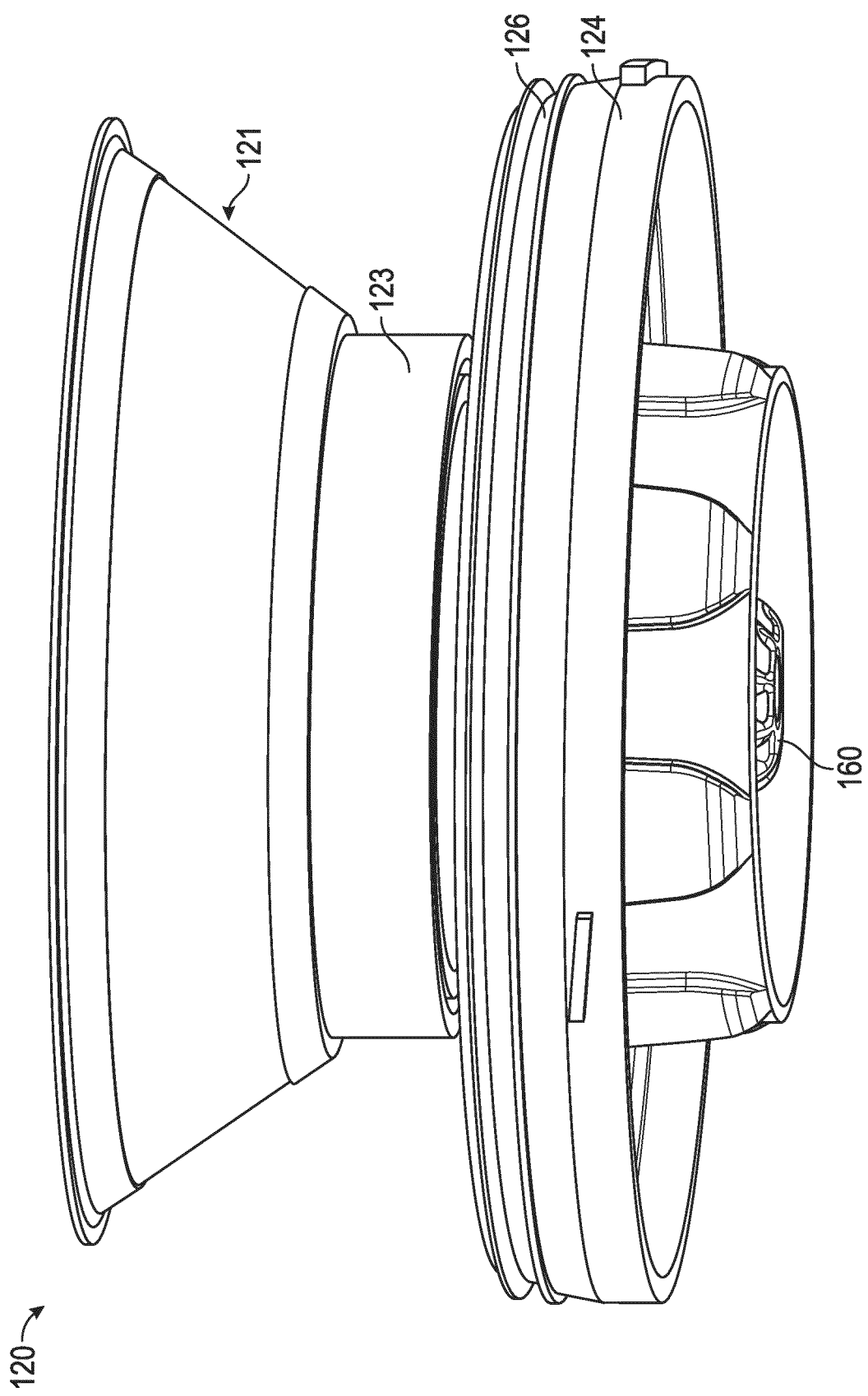
FIG. 5 is a front view of a strainer section for the centrifugal juicer of FIGS. 1 and 2, according to an exemplary embodiment.

The strainer section 120 is structured to strain or filter the solid parts of the cut-up food stuffs received in the food inlet 111 from the juice extracted from the food stuffs. In this regard, the strainer section 120 substantially only permits juice to flow through strainer 121 to the juice spout 112. As shown in FIGS. 3 and 5, the strainer section 120 is generally basket shaped and includes a strainer 121 (e.g., filter, mesh, sifter, sieve, etc.), a rim 122, a strainer bottom member 123, a juicer sieve housing 124, a cutting member 125 (e.g., grating disk, grating teeth, etc.), a sealing member 126, and a drive member 160.

Figure 6:
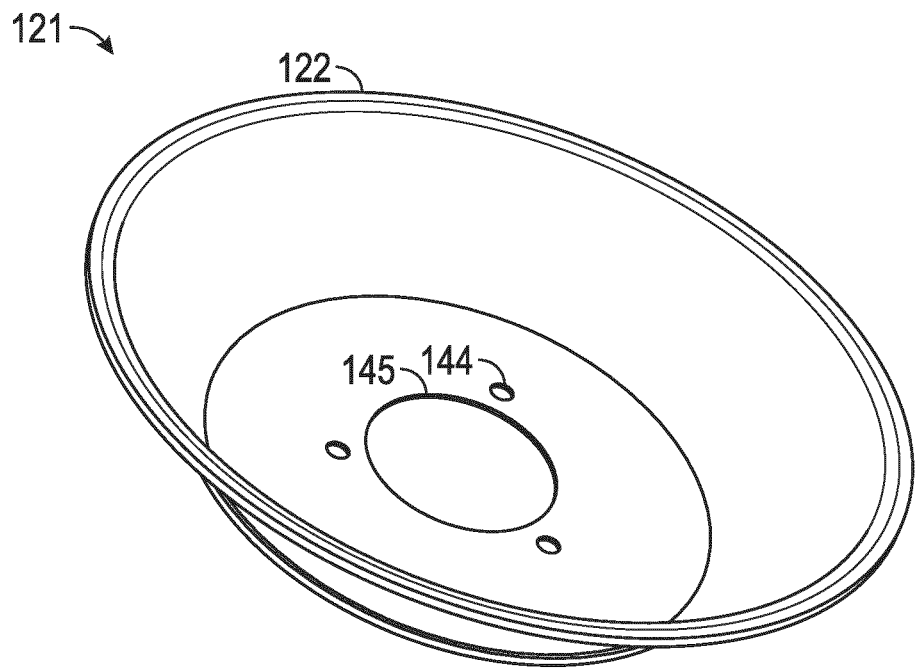
FIG. 6 is a front isometric view of a strainer of the strainer section of FIG. 5, according to an exemplary embodiment.
Figure 7:
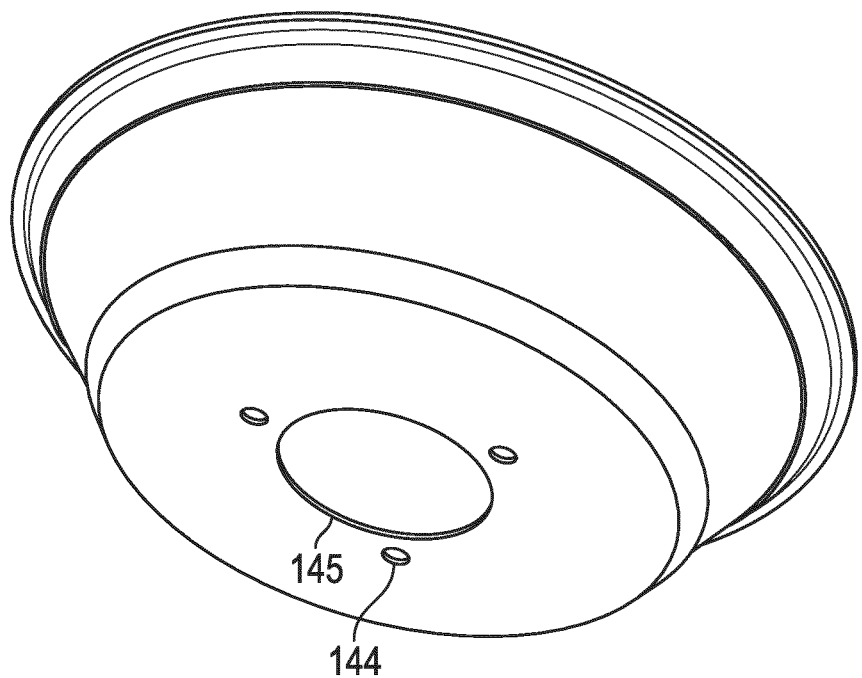
FIG. 7 is a bottom isometric view of the strainer of FIG. 6, according to an exemplary embodiment.

The strainer 121 is shown in FIGS. 6-7. As shown, the strainer 121 is of a frusto-conical shape. However, in other embodiments, the strainer 121 may be of any shape (e.g., cylindrical, etc.). Similarly, the strainer 121 may be of any porosity desired (more porosity may permit relatively more solid parts of the food stuff to be provided with the juice via the juice spout 112 while lesser porosity reduces the solid parts of the food stuffs from passing through the strainer 121 to the juice spout 112). The strainer 121 is shown to include a rim 122. When the top section 110 is engaged with the strainer section 120, the rim 122 engages with an upper portion of the cavity 116 (below the pulp exit 113) to facilitate providing the cut-up solid food stuffs to the pulp exit 113 and substantially prevent the cut-up substantially solid food stuffs from going to any other place than the pulp container 140.

The strainer 121 is also shown to define an aperture 144 and an opening 145, where the opening 145 is centrally located. The opening 145 is sized to permit the cutting member adapter 164 of the drive member 160 to pierce through for engagement/coupling to the cutting member 125. The apertures 144 may be used to receive one or more fasteners to couple the strainer 121 to, for example, the cutting member 125. Accordingly, in one embodiment, the strainer 121 is attached to the cutting member 125 such that both the strainer 121 and the cutting member 125 rotate during the juicing process (i.e., rotate in unison). Advantageously, the rotating of the strainer 121 also facilitates providing the cut-up solid food stuffs to the pulp exit 113. In other embodiments, the strainer 121 is held stationary while the cutting member 125 is operated.

Figure 8:
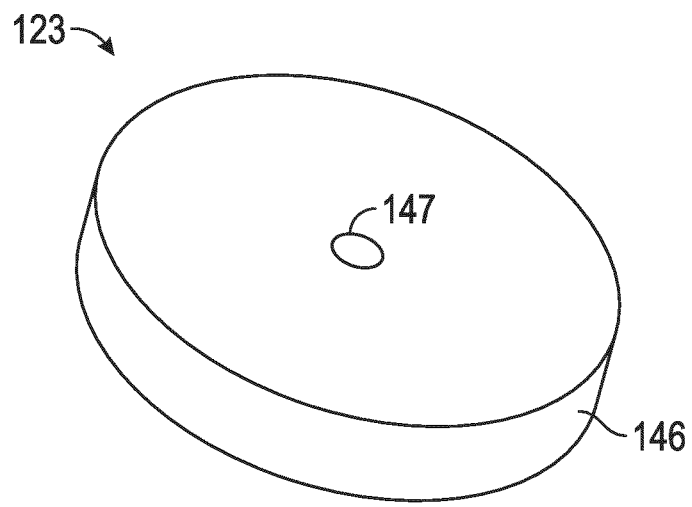
FIG. 8 is a top perspective view of a strainer bottom member of the strainer section of FIG. 5, according to an exemplary embodiment.
Figure 9:
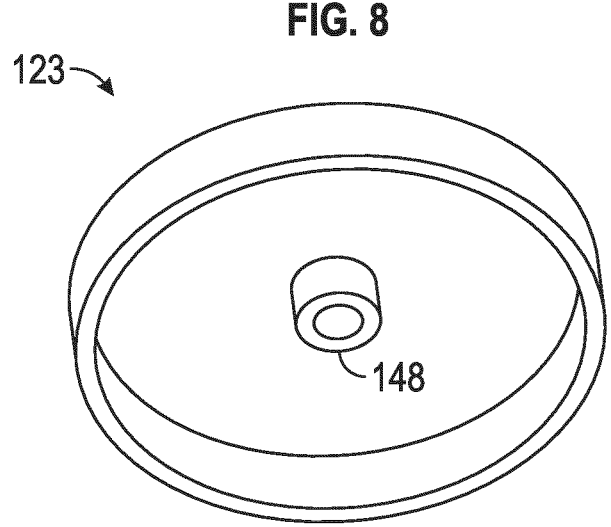
FIG. 9 is a bottom perspective view of a strainer bottom member of FIG. 8, according to an exemplary embodiment.

Positioned below the strainer 121 (i.e., proximate the juicer sieve housing 124) is the strainer bottom member 123. The strainer bottom member 123 is shown in FIGS. 8-9. The strainer bottom member 123 is structured to substantially cover or shield an upper portion of the drive member 160 (e.g., to prevent the food stuffs and juice from adversely affecting the drive ability of the drive member 160 to power the cutting member 125). Accordingly, while shown as a cylindrically shaped member, the strainer bottom member 123 may have any shape and size to insulate or shield an upper part of the drive member (e.g., proximate the cutting member adapter 164). In certain embodiments, the strainer bottom member 123 may be used to couple to the strainer 121 (e.g., via one or more fasteners, etc.).

In the embodiment shown, the strainer bottom member 123 includes a peripheral wall 146. The strainer bottom member 123 also includes a centrally located cylinder member 148 that defines an opening 147. The cutting member adapter 164 is sized to fit through the opening 147. The centrally located cylinder member 148 fits around the upper part of the drive member 160 but below a top surface of the strainer bottom member 123. Accordingly, when the cutting member 125 is attached to the cutting member adapter 164, the attachment of the cutting member 125 to the drive member 160 (via the cutting member adapter 164) with the cylinder member 148 functions to attach the strainer bottom member 123 to the drive member 160 to substantially prevent the components from becoming free. In this regard, the strainer bottom member 123 rotates with the strainer 121 and the cutting member 125.

In sum, the strainer bottom member 123 is structured to attach to the drive member 160 on or near its bottom and attach to the strainer 121 and the cutting member 125 on or near its top. In one embodiment, the strainer bottom member 123 is used as the means to attach the strainer 121 and the cutting member 125 to the top of the drive member 160. As described above, the strainer bottom member 123 may also help block juice from getting by the drive member 160. However, in some embodiments, the strainer bottom member 123 may be excluded. For example, by connecting the drive member 160 directly to the strainer 121 and cutting member 125, then the strainer bottom member 123 may be removed.

Figure 10:
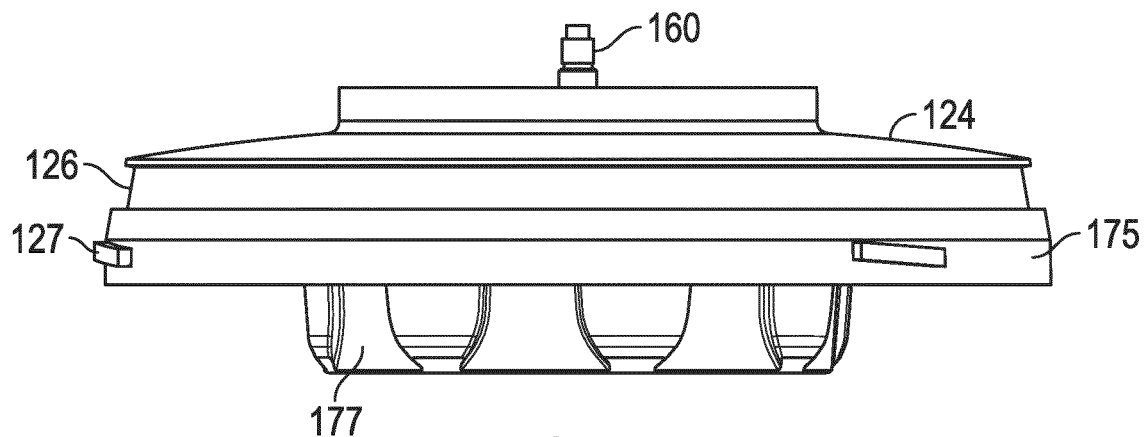
FIG. 10 is a front view a juicer sieve housing and drive member of the strainer section of FIG. 5 with the strainer bottom member and strainer removed, according to an exemplary embodiment.
Figure 11:
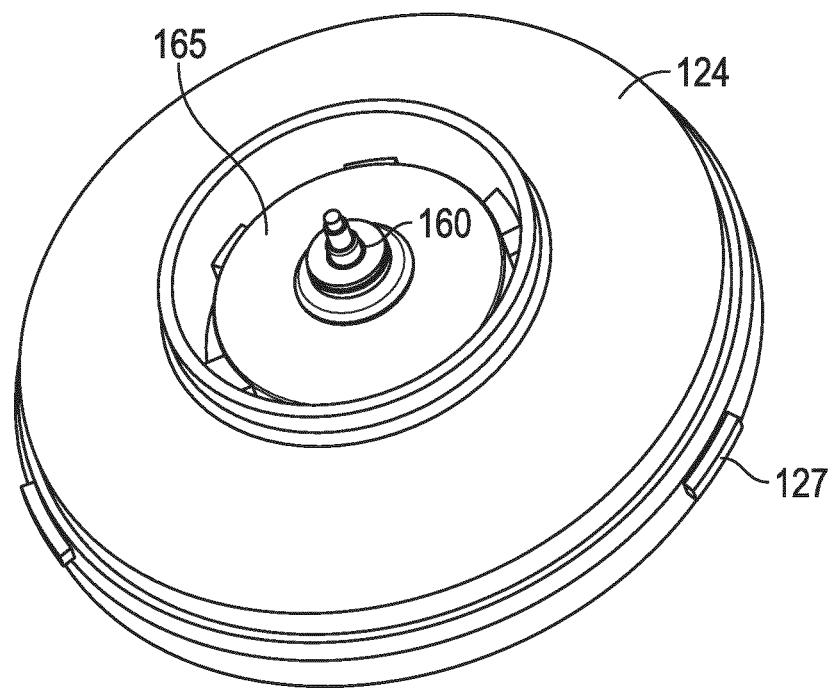
FIG. 11 is a top perspective view of the juicer sieve housing and drive member of FIG. 10, according to an exemplary embodiment.
Figure 12:
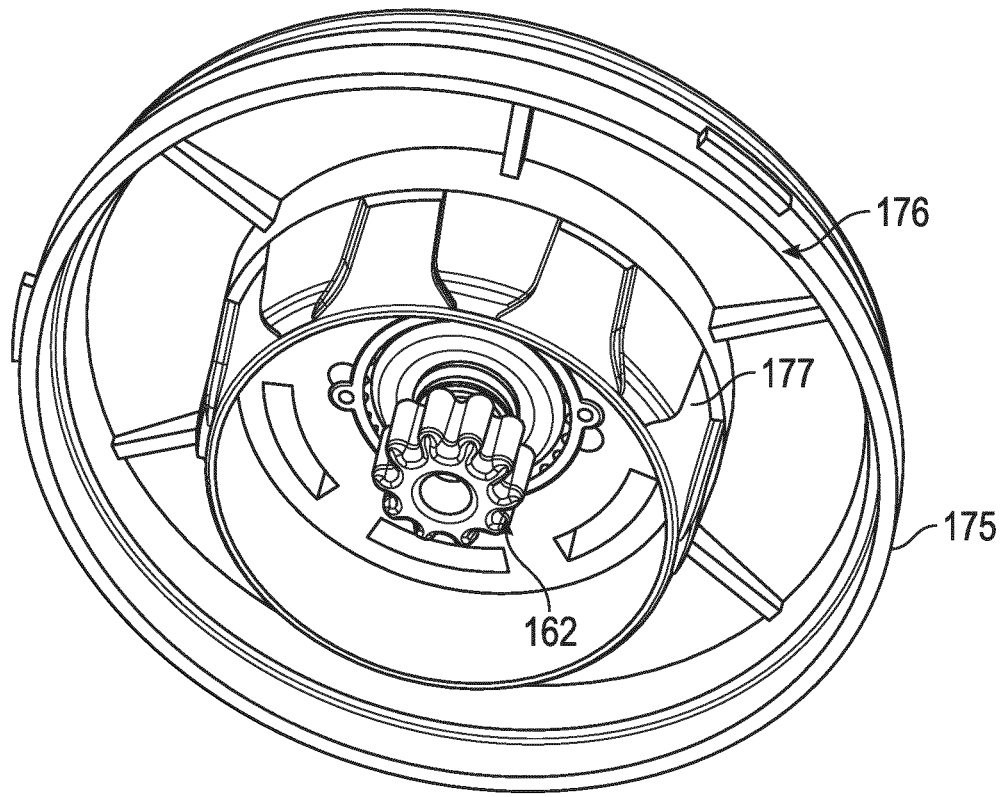
FIG. 12 is a bottom perspective view of the juicer sieve housing and drive member of FIG. 10, according to an exemplary embodiment.
Figure 13:
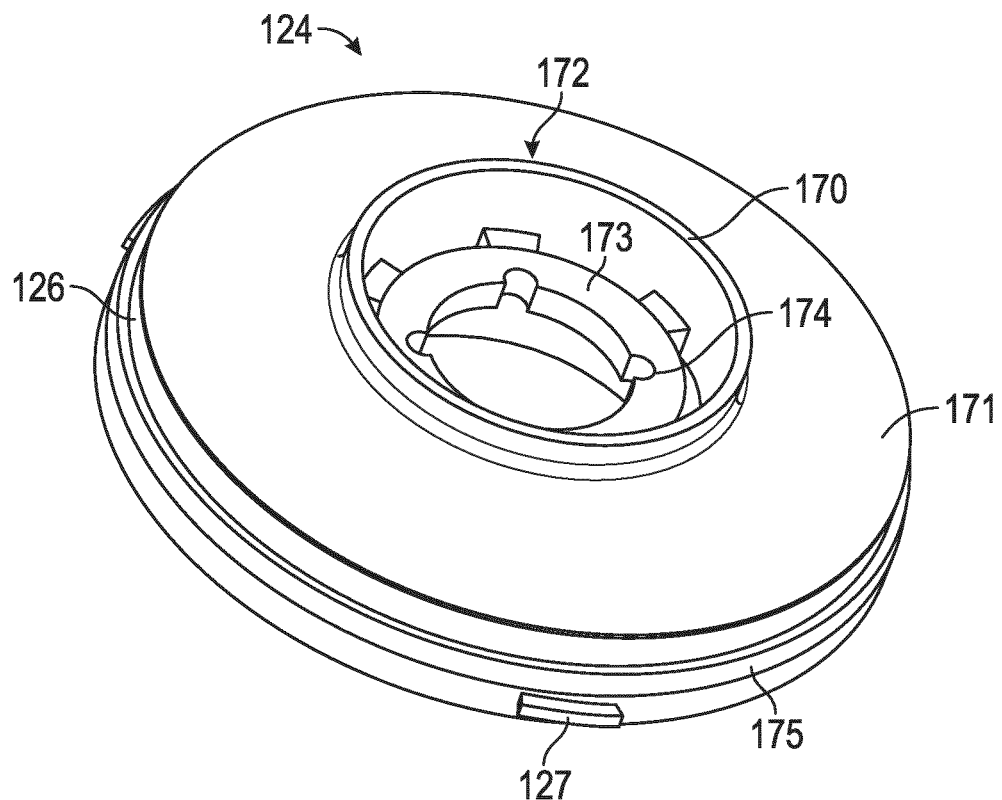
FIG. 13 is a top perspective view of the juicer sieve housing with the drive member, strainer, and strainer bottom member removed, according to an exemplary embodiment.

With the strainer 121 and strainer bottom member 123 shown and described, referring now to FIGS. 10-12, a front (FIG. 10), top perspective (FIG. 11), and bottom perspective view (FIG. 12) of the juicer sieve housing 124 assembled with the drive member 160 are shown according to various exemplary embodiments. In FIGS. 10-12, the strainer 121 and strainer bottom member 123 have been removed for clarity. The juicer sieve housing 124 is shown with the drive member 160 removed in FIGS. 13-14. Accordingly, referring collectively to FIGS. 10-14, the juicer sieve housing 124 is explained.

The juicer sieve housing 124 is structured to couple to the drive member 160. In the embodiment shown, the juicer sieve housing 124 includes a wall 170. The wall 170 defines an opening 172 and has a cylindrical shape such that the wall 170 surrounds the opening 172. The wall 170 is raised or elevated relative to an upper surface 171 of the juicer sieve housing 124.

The juicer sieve housing 124 is shown to include a ledge 173 (e.g., extension, projection, jut, etc.) extending within the opening 172. The ledge 173 is concentric relative to the wall 170 and defines one or more grooves 174 (e.g., indents, ruts, ridges, etc.). As described herein, an upper surface of the ledge 173 (i.e., proximate the upper surface 171) and the grooves 174 cooperate with the drive member 160 to couple the drive member 160 to the juicer sieve housing 124 to form a single component.

The juicer sieve housing 124 is also shown to include one or more projections 127 (e.g., threads, etc.) positioned circumferentially on a side wall 175 of the juicer sieve housing 124 and below the sealing member 126. As described above, the projections 127 are structured to engage with the first ridge 114 of the cavity 116 of the housing 115 to couple the strainer section 120 to the top section 110. As mentioned above, in other embodiments, any other type of attachment, coupling, or mating mechanism may be used to couple to the strainer section 120 to the top section 110 (e.g., an interference-type relationship between the cavity 116 and the juicer sieve housing 124, a snap engagement, etc.).

Figure 14:
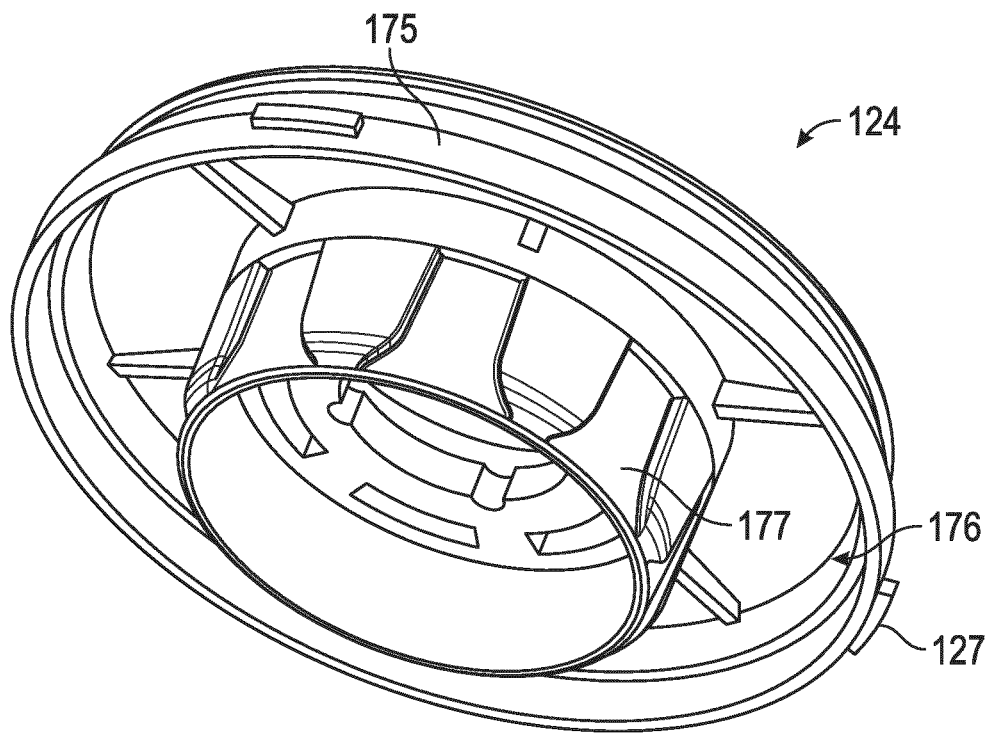
FIG. 14 is a bottom perspective view of FIG. 13, according to an exemplary embodiment.

As shown in FIGS. 12 and 14, the side wall 175 defines a cavity 176 on a bottom side of the juicer sieve housing 124. A member 177 that is cylindrically-shaped is centrally positioned relative to a center of the opening 172. The member 177 surrounds a lower portion of the drive member 160 (i.e., the motor adapter 162). The member 177 also substantially surrounds the drive member adapter 132 of the motor 131 when the drive member adapter 132 and the motor adapter 162 are engaged. Advantageously, the member 177 substantially shields the coupling between the motor 131 and the drive member 160. This reduces the likelihood of unwanted particles from becoming lodged in the coupling or otherwise interfering with the ability to repeatedly engage/disengage the drive member 160 to the motor 131. While the Figures depict a cylindrically-shaped member, in other embodiments, any shaped may be used. In alternate embodiments, the member 177 may be removed. All such variations are intended to fall within the spirit and scope of the present disclosure.

The juicer sieve housing 124 is also shown to include a sealing member 126. As mentioned above, the sealing member 126 is structured to form a substantially fluid tight seal when the strainer section 120 is engaged with the top section 110. Accordingly, the sealing member 126 circumferentially surrounds an upper part of the juicer sieve housing 124 (see, e.g., FIG. 10). In this regard, the extracted juice (and solid food stuffs) are substantially prevented from flowing towards the motor housing 130. Rather, the juice and solid food stuffs are substantially only directed to the juice spout 112 and pulp exit 113, respectively. Accordingly, the sealing member 126 may be constructed from any type of sealing material (e.g., plastic, rubber, etc.). As shown, the sealing member 126 has a complementary shape to the cavity 116 where the strainer section 120 is received. As mentioned above, the strainer section 120 is inserted into the top section 110 via the lower opening 118 and situated where the strainer section 120 engages with the top section 110 (e.g., where the diameter is D1 (FIG. 3), such that that sealing member 126 has a circumferential diameter near D1 (as compared to the larger diameter D2)). It should be understood that in this embodiment, the cavity 116 has a circular shape, such that the sealing member 126 also has circular shape. In other embodiments, any shape may be used.

Figure 15:
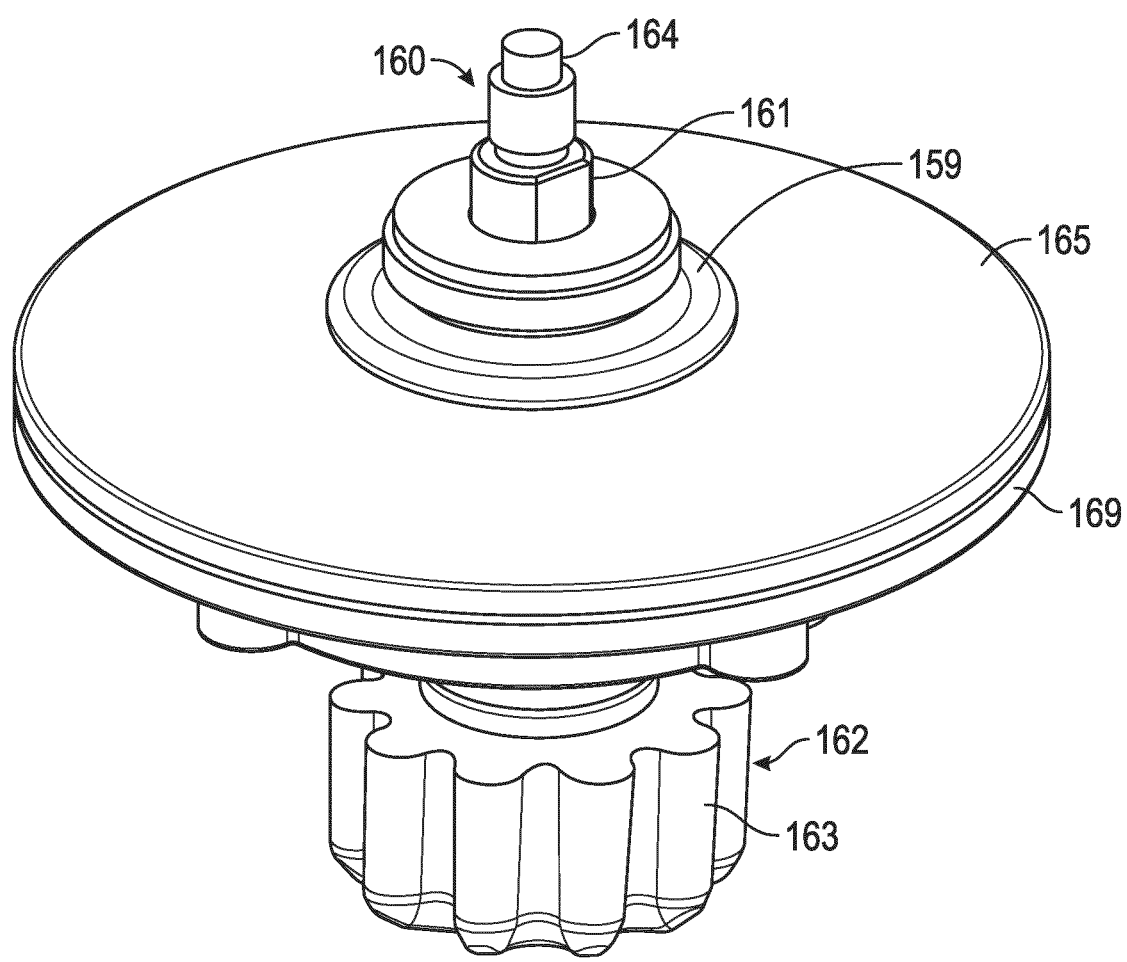
FIG. 15 is a top perspective view of the drive member with a bracket of the strainer section of FIG. 5 with the juicer sieve housing, strainer, and strainer bottom member removed, according to an exemplary embodiment.
Figure 16:
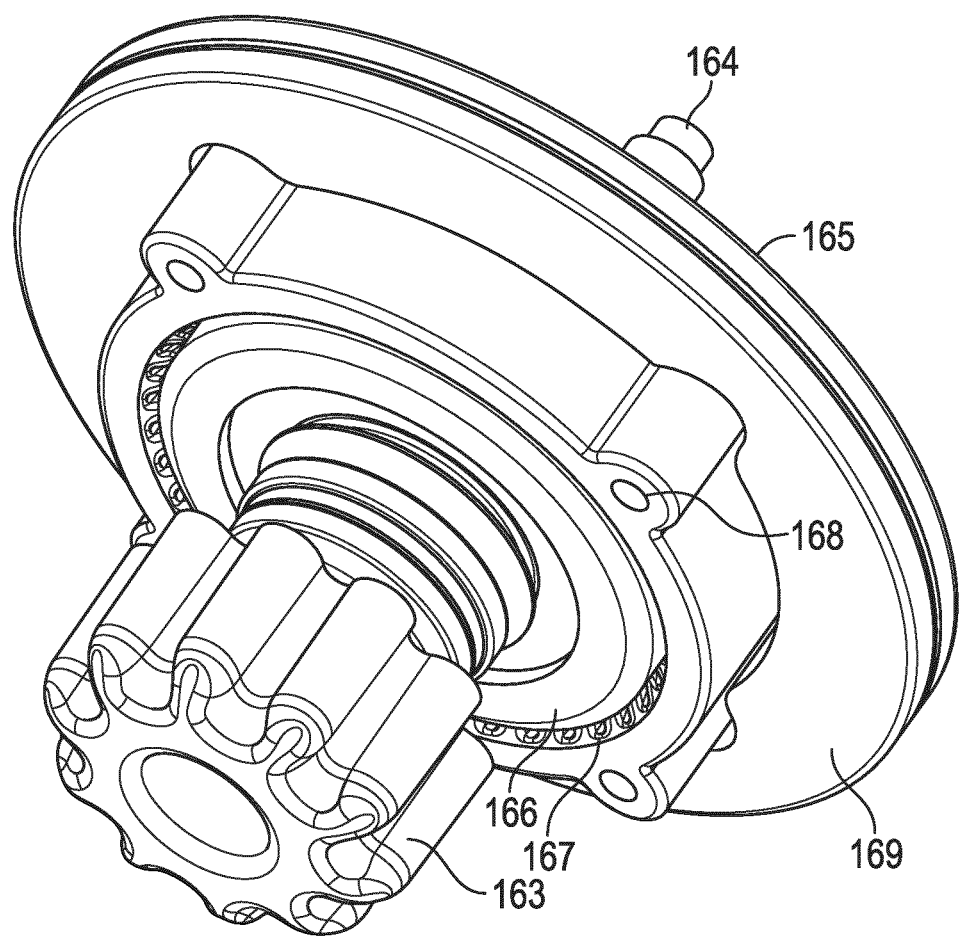
FIG. 16 is a bottom perspective view of FIG. 15, according to an exemplary embodiment.
Figure 17:
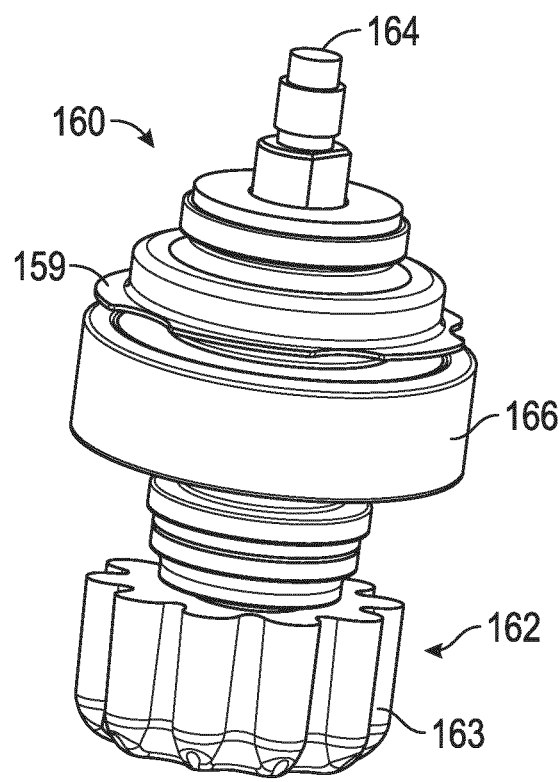
FIG. 17 is a front view of the drive member of FIGS. 15-16 with the bracket removed, according to an exemplary embodiment.

Referring now to FIGS. 15-17, a drive member 160 for the strainer section 120 is shown, according to various exemplary embodiments. As shown, the drive member 160 includes a body 161 having a motor adapter 162 and a cutting member adapter 164, where the cutting member adapter 164 is positioned longitudinally opposite relative to the motor adapter 162. The motor adapter 162 is structured to couple the drive member 160 to the motor 131. As shown, the motor adapter 162 has a plurality of ridges 163 (e.g., projections, etc.) that fit or are received within a plurality of grooves 134 (see FIG. 20) of the drive member adapter 132 (e.g., coupling structure) of the motor 131 when the drive member 160 is coupled to the motor 131. The cutting member adapter 164 is structured to couple the drive member 160 to a cutting member 125. It should be noted that the shapes and sizes of the cutting member adapter 164 and the motor adapter 162 are for illustrative purposes only as a wide variety of shapes and sizes may be used to couple the drive member 160 to the cutting member 125 and motor 131, respectively.

As shown in FIGS. 15-16, the drive member 160 is coupled to a housing, shown as bracket 165. The bracket 165 is structured to attach the drive member 160 to the juicer sieve housing 124. As shown, the bracket 165 (e.g., disc member, body, housing, etc.) surrounds a ring member 166 (FIG. 17) of the drive member 160. The bracket 165 includes bearings 167 (e.g., ball bearings, etc.) that interface with the ring member 166 of the drive member 160. The bearings 167 permit rotation of the drive member 160 while reducing an amount of wear and tear on the drive member 160 during operation. The bracket 165 may be attached to the drive member 160 in any fashion. As shown, the drive member 160 includes a circumferential projection 159 that substantially surrounds the drive member 160. The circumferential projection 159 is structured to engage with the bracket 165 to at least partially couple the bracket 165 and the drive member 160.

As mentioned above, the bracket 165 also couples or attaches to the juicer sieve housing 124. As shown in FIG. 16, the bracket 165 includes one or more projections 168 positioned proximate the motor adapter 162. The projections 168 are sized and shaped to be received in the grooves 174 of the juicer sieve housing 124. Interaction between the grooves 174 and projections 168 substantially prevents relative rotation between the bracket 165 and juicer sieve housing 124. The bracket 165 is also shown to include an insulating member 169 positioned above the projections 168. To couple the drive member 160 and bracket 165 to the juicer sieve housing 124, the motor adapter 162 is first passed through the top of the opening 172. The projections 168 are received in the grooves 174 and the insulating member 169 rests on the ledge 173. In one embodiment, the insulating member 169 is constructed from rubber. In other embodiments, the insulating member 169 is constructed from any material (e.g., plastic, etc.). The insulating member 169 insulates the drive member 160, bracket 165 and juicer sieve housing 124 assembly. For example, when the juicer is operated, the insulating member 169 absorbs much of the vibrations to substantially prevent harmful vibrations from emanating through the strainer section 120 and elsewhere in the juicer 100 that may cause an undesirable operating experience for a user.

Figure 18:
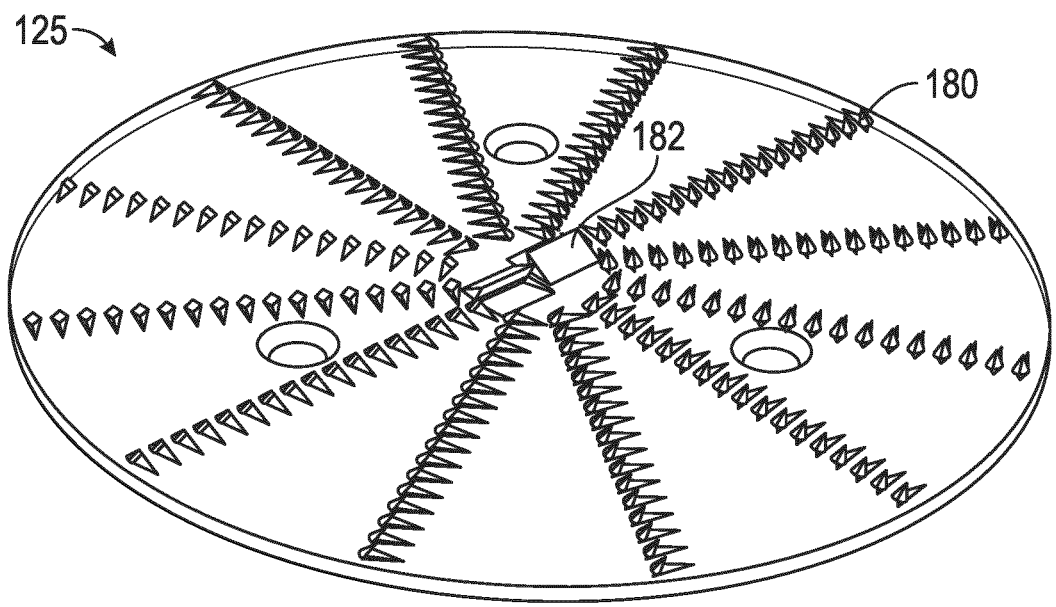
FIG. 18 is a top perspective view of a cutting member for a centrifugal juicer, according to an exemplary embodiment.

Referring now to FIG. 18, a cutting member 125 for the centrifugal juicer 100 is shown according to an exemplary embodiment. In use, the cutting member 125 sits in a lower part of the strainer 121. The cutting member 125 is shown to include teeth 180 and an adapter 182. The cutting member 125 is also shown to include one or more openings, shown as three (3) in FIG. 18, that may be used to fasten the cutting member 125 to the strainer 121. Therefore, as mentioned above, the cutting member 125 and strainer 121 both rotate and rotate in unison. The adapter 182 is structured to mate or engage with the cutting member adapter 164, such that the drive member 160 (when powered) may drive the cutting member 125. As shown, the cutting member 125 includes teeth 180 that are structured to cut or slice the food stuffs from the rotary motion of the cutting member 125. However, in other embodiments, the cutting member 125 may be of any shape and structure to cut, grate, or otherwise slice the food stuffs received via the food inlet 111, in order to better facilitate extraction of juices during centrifugal motion.

When these features are assembled, a one-piece strainer section 120 component is formed. According to the present disclosure, the features of the strainer section 120 are permanently coupled such that the strainer section 120 permanently represents only one component, in a way that conventional juicers have been unable to achieve. As such, the number of components included with the juicer 100 are relatively small. Further, the level of complexity is reduced relative to other conventional centrifugal juicers. According to an alternate embodiment, one or more of the individual components may be removed to facilitate disassembly of the strainer section 120.

Figure 19:
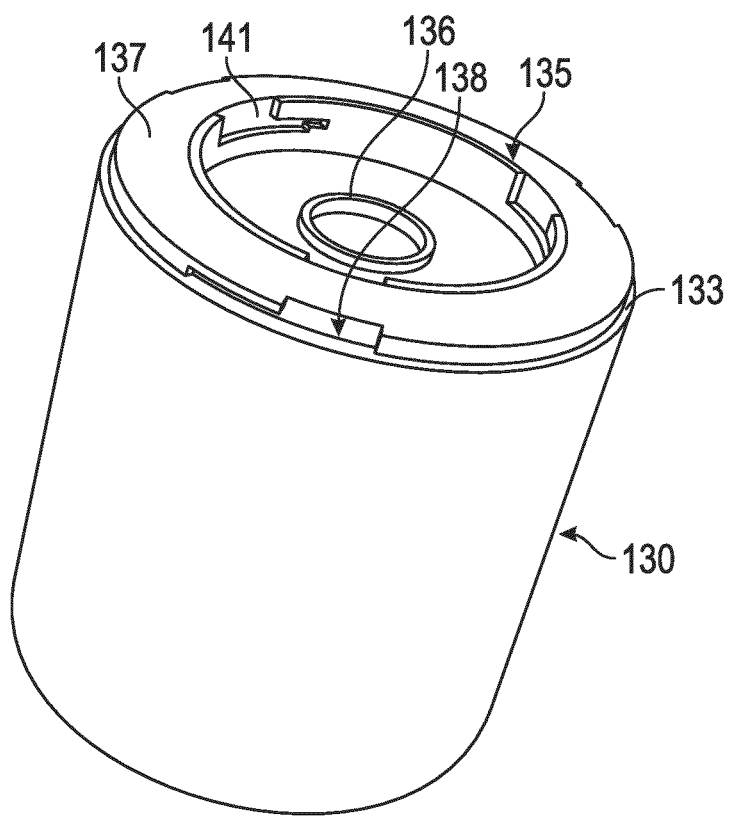
FIG. 19 is a top perspective view of a motor housing for the centrifugal juicer of FIGS. 1 and 2, according to an exemplary embodiment.

Referring now to FIG. 19, features of the third main component—the motor housing 130—are shown, according to various exemplary embodiments. FIG. 19 depicts the motor housing 130 itself, according to an exemplary embodiment. The motor housing 130 is structured to house and protect the motor 131. As such, the motor housing 130 and the components included in the motor housing 130, such as the motor 131, represent a single component, configured in a way that conventional juicers have been unable to achieve. The motor housing 130 is shown to be generally cylindrical in shape, however any shape is possible. The motor housing 130 may also be constructed from any material (e.g., plastic, etc.). As described herein, to assemble the centrifugal juicer 100, the motor housing 130 is coupled to the top section 110 and engages with the strainer section 120 (e.g., the motor adapter 162).

As shown in FIG. 19, the motor housing 130 defines a recess 135 (e.g., cavity, etc.) and an opening 136 (e.g., aperture, etc.) located in the center of the recess 135. The drive member adapter 132 of the motor 131 extends through the opening 136 to engage with the motor adapter 162 when the top section 110 and strainer section 120 are coupled to the motor housing 130. Further, when engaged, the cylinder member 177 may engage with a lower surface of the recess 135 to shield the coupled motor 131 and drive member 160. In some embodiments, the motor 131 may be operatively coupled to a motor coupling or adapter of the motor housing 130 (rather than the motor 131 itself), such that the drive member 160 selectively engages with the motor coupling or adapter of the motor housing instead of directly coupling to a motor coupling of the motor. All such variations are intended to fall within the spirit and scope of the present disclosure.

As also shown in FIG. 19, the motor housing 130 includes a top member 137 (e.g., wall, etc.) positioned on an upper part of the motor housing 130. The top member 137 surrounds the recess 135. The top member 137 also defines a groove 138 located on an external surface of the top member 137 (e.g., furthest from the recess 135). In operation, a ridge 117 of the housing 115 of the top section 110 fits over the top member to rotatably engage with the groove 138 to attach the top section 110 to the motor housing 130. Thus, the top section 110 and strainer section 120 are rotatably engaged and disengaged with the motor housing 130. While the groove 138-to-ridge 117 engagement represents a twist lock feature, which is shown in the Figures, it should be understood that other coupling mechanisms for the top and strainer sections 110, 120 to the motor housing 130 may be used. For example, in other embodiments, full threads may be used. In still other example embodiments, a snap engagement may be used. In yet another example embodiment, the coupling between the motor 131 and the drive member 160 may couple the top and strainer sections 110, 120 to the motor housing 130 such that the top and strainer sections 110, 120 are just placed on top the motor housing 130. All such variations are intended to fall within the spirit and scope of the present disclosure.

As described herein, in other embodiments, the strainer section 120 may mate or couple to the motor housing 130 first followed by the top section 110 coupling to the mated strainer section 120 and motor housing 130. In one embodiment, mating between the strainer section 120 and the motor housing 130 is via engagement of the drive member 160 and the motor 131. In another embodiment, an additional mating feature may be used to enhance or strengthen the coupling. In the example shown in the Figures herein, the top member 137 defines a second groove 141 on an internal surface (proximate the opening 136). The strainer section 120 may include a ridge or projection (e.g., a second projection, like projection 127) that cooperates with the groove 141 to couple or mate the strainer section 120 to the motor housing 130. This type of engagement represents a twist lock feature like the groove 138-to-ridge 117 engagement described above. However, like the above described mating feature, many other types of mating or attachment mechanisms between the strainer section 120 and the motor housing 130 may be used (e.g., an interference type relationship, threads, etc.), such that groove 141 is embodiment is not meant to be limiting.

In this configuration where the strainer section 120 is first coupled or mated with the motor housing 130, the strainer section 120 has two mating surfaces (one for the motor housing 130 and one for the top section 110), the top section 110 has two mating surfaces (one for the motor housing 130 and one for strainer section 120), and the motor housing 130 has two mating surfaces (one for the strainer section 120 and one for the top section 110). In comparison, in the configuration where the top section 110 is first coupled to the strainer section 120 and that assembly is then mated or coupled with the motor housing 130, only the top section 110 has two mating surfaces (one for the strainer section 120 and one for the motor housing 130). The strainer section 120 has one mating surface (for the top section 110) and the motor housing 130 has one mating surface (for the top section 110). These configurations may be utilized based on the on the type of centrifugal juicer. For example, an integrated pulp container centrifugal juicer may use the two mating surface structure for each component in order to increase the robustness of the juicer (due to its relatively larger size with the integrated pulp container).

Referring still to FIG. 19, when the top section 110 and strainer section 120 are engaged or mated with the motor housing 130, an interlock device 133 (e.g., safety mechanism, etc.) is activated. The interlock device 133 is structured to selectively control power to the motor 131. When activated, the interlock device 133 permits electrical power to the motor 131 for the motor 131 to drive the cutting member 125 during the juicing process. When deactivated, electrical power is prevented from reaching the motor 131. According to the present disclosure, the interlock device 133 is activated only when the top section 110 is correctly received on the motor housing 130.

The interlock device 133 may be activated/deactivated either directly or indirectly via engagement of the top section 110 to the motor housing 130. As shown, the interlock device 133 is activated directly. In the embodiment depicted, the interlock device 133 is structured as a switch. The switch is depressed when the top section 110 is correctly engaged with the motor housing 130. Depression of the switch closes the circuit and allows the motor 131 to be powered. In other embodiments, the interlock device 133 may be structured as a proximity sensor that detects the correct position of the top and strainer sections 110, 120 to the motor housing 130 to activate the interlock device 133.

In still other embodiments, magnetic contacts may be used: when a pole of the magnet of the top section aligns with a pole of the magnet of the motor housing, the interlock device is activated to permit power to the motor 131. According to an alternate embodiment and as mentioned above, the interlock device 133 is activated indirectly via the engagement of the top section 110 to the motor housing 130. For example, a mechanism in the strainer section 120 may be activated, which in turn activates the interlock device 133 when the top section 110 and motor housing are assembled correctly.

By providing activation/deactivation of the interlock device 133 during engagement/disengagement of the top and strainer sections 110, 120 with the motor housing 130, external latch members used in convention centrifugal juicers are eliminated. Consequently, the number of parts are reduced as are the number of steps needed to assemble the centrifugal juicer 100 of the present disclosure for operation, relative to conventional centrifugal juicers.

Figure 20:
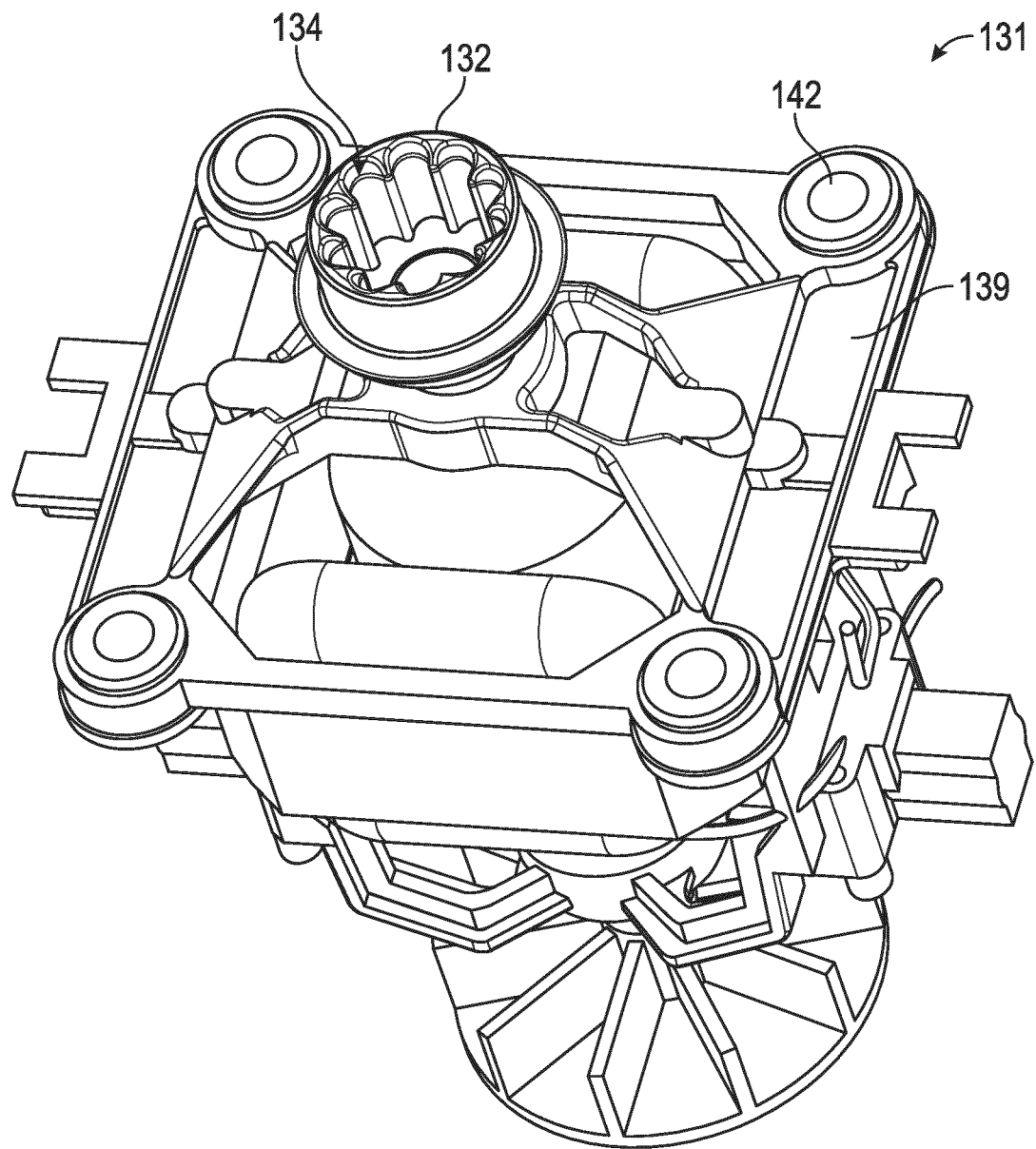
FIG. 20 is a top perspective view of a motor housed in the motor housing of FIGS. 1, 2, and 19, according to an exemplary embodiment.
Figure 21:
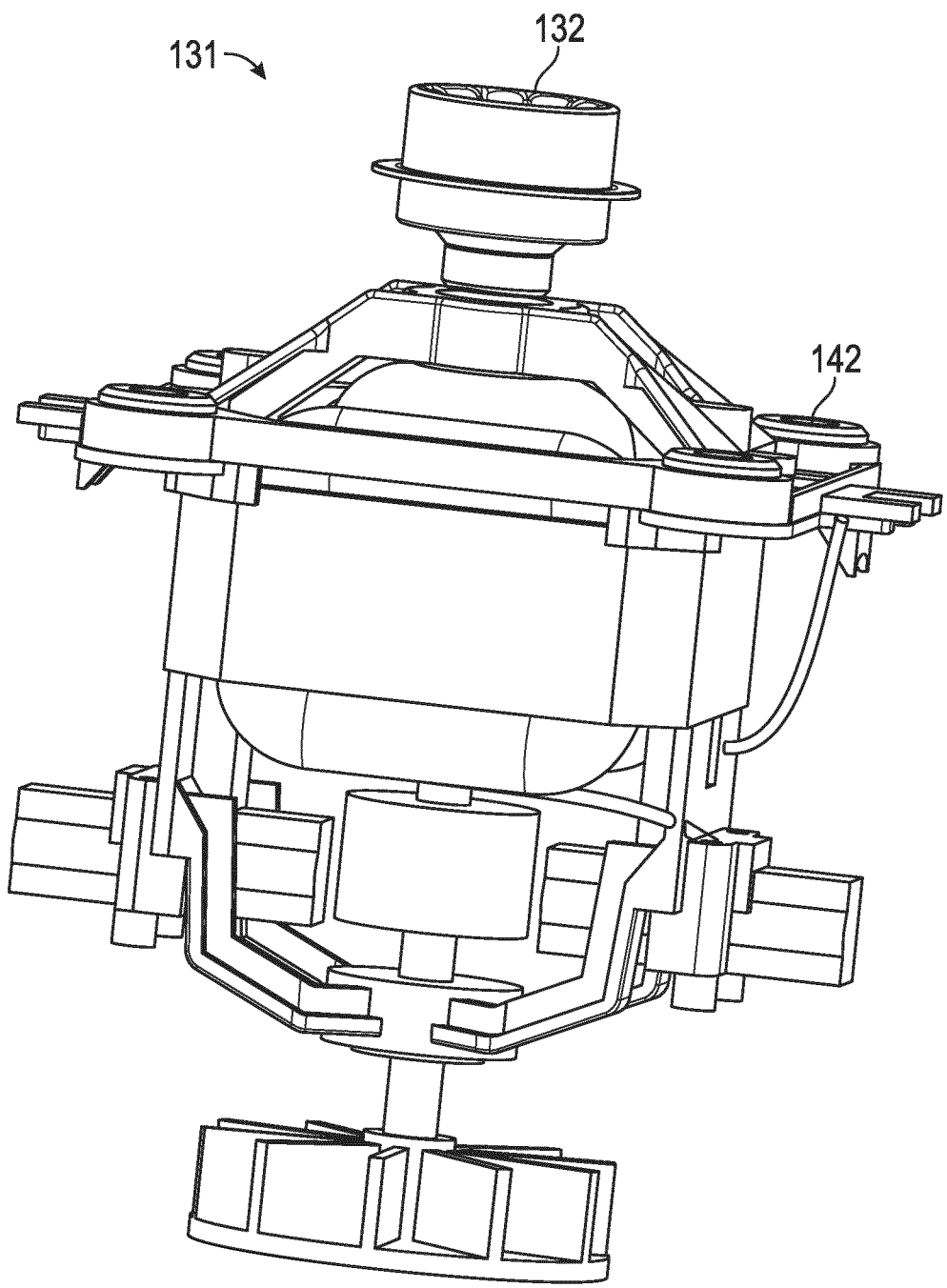
FIG. 21 is a front view of the motor of FIG. 20, according to an exemplary embodiment.

Referring now to FIGS. 20-21, a top perspective view (FIG. 20) and a front view (FIG. 21) of a motor for the centrifugal juicer of the present disclosure are shown, according to exemplary embodiments. The motor 131 is attached to the motor housing 130. As shown, the motor 131 includes a housing bracket 139 that facilitates attachment of the motor 131 to the motor housing 130. In the example shown, the housing bracket 139 includes apertures 142 that receive a fastener to fastens the housing bracket 139 (and, in turn, the motor 131) to the motor housing 130. However, other attachment mechanisms for the motor 131 to the motor housing 130 may also be used, such that the depicted configuration is not meant to be limiting.

The motor 131 may be of any configuration. In some embodiments, the motor 131 may be of a variable speed to permit a user to select a speed setting while in other embodiments, the motor 131 may be of a single speed. The motor 131 may be battery-powered in a portable or mobile configuration for the centrifugal juicer 100. In another embodiment, the motor 131 is electrically coupled to an alternating current (AC) electrical cord that is used with an electrical outlet. Accordingly, depending on the application, the motor 131 may be both AC and direct current (DC) powered with varying power outputs (e.g., 300 watt motor, 1000 watt motor, etc.). Furthermore, based on the motor 131 configuration, the cutting member 125 may be driven at a wide variety of rotational speeds, i.e. revolutions-per-minute (RPM) (e.g., 6500 RPM, 12000 RPM, etc.). Therefore, the motor is widely configurable based on the intended application (e.g., an intended high-powered centrifugal juicer may utilize the 1000 watt motor while an intended lower-powered centrifugal juicer may utilize the 300 watt motor).

Figure 22:
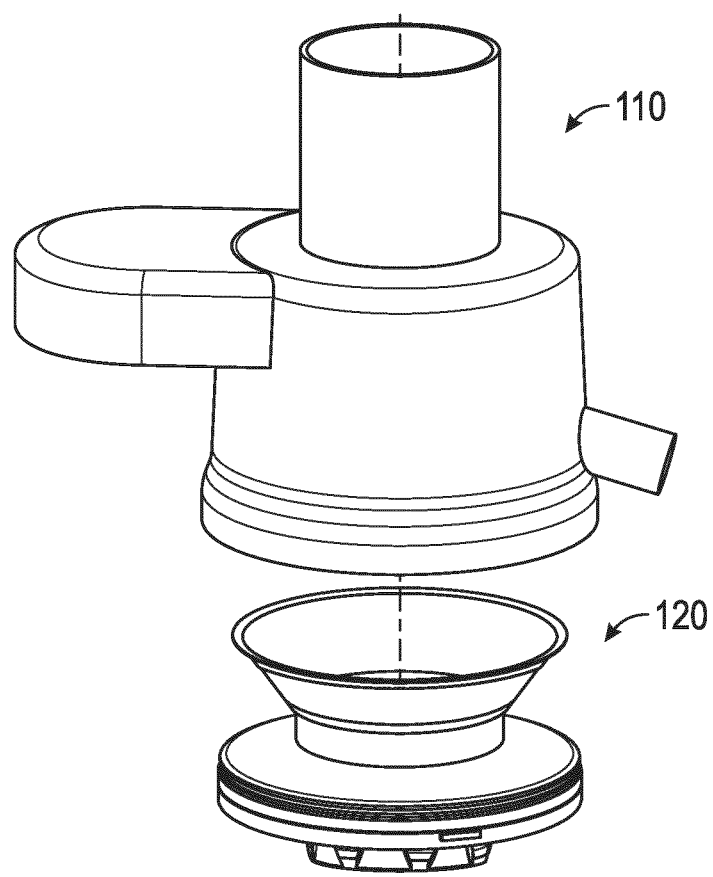
FIG. 22 is an exploded assembly view of the strainer section proximate a lower part of the top section prior to engagement of the strainer section to the top section, according to an exemplary embodiment.
Figure 23:
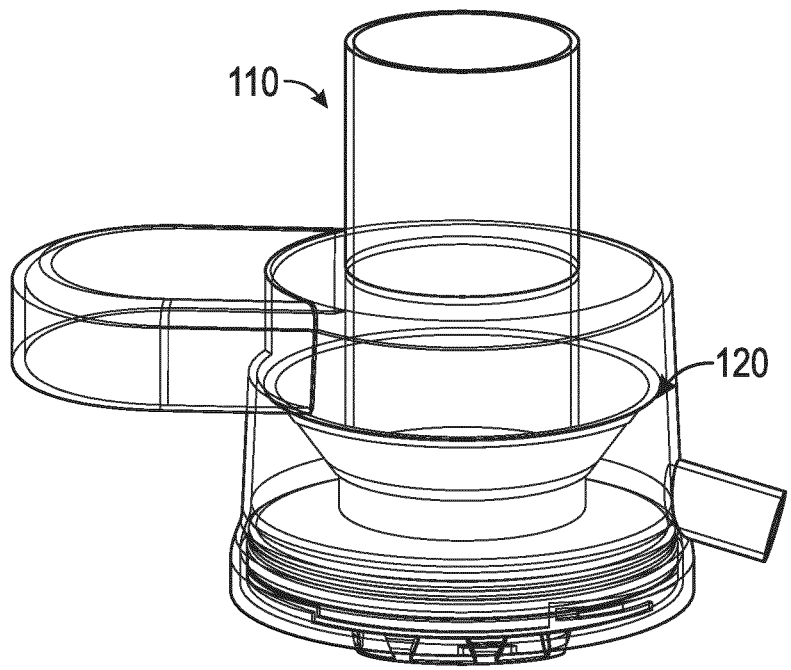
FIG. 23 is a front transparent view of the strainer section engaged with the top section of a centrifugal juicer, according to an exemplary embodiment.

With the aforementioned description above regarding the top section 110, the strainer section 120, the motor housing 130, and the components that form each section, FIGS. 22-25 pictorially represent a method of assembling the centrifugal juicer 100 of the present disclosure according to an exemplary embodiment. FIGS. 22-23 depict step one of the assembly process: attach the strainer section 120 to the top section 110. As shown in FIG. 22, the top section 110 is positioned longitudinally above the strainer section 120. In turn, the strainer section 120 is inserted into the bottom of the top section 110 (e.g., via the opening 118 shown in FIG. 4). In a conventional assembly of centrifugal juicers, the strainer basket is inserted into the juice catching section from the top and then the juicer cover is placed over the strainer basket. In the example embodiment shown, the top section 110 is coupled to the strainer section 120 via the rotatable engagement of the first ridge 114 (of the cavity 116 of the housing 115) and the projection(s) 127 of the strainer section 120. This engagement is shown in FIG. 26, which depicts a cross-sectional view of the top section and strainer section 120 assembly, according to an exemplary embodiment. However, as mentioned above, many other types of engagement or attachment mechanisms may be used (e.g., a snap engagement, etc.) to attach the strainer section 120 to the top section 110.

Figure 24:
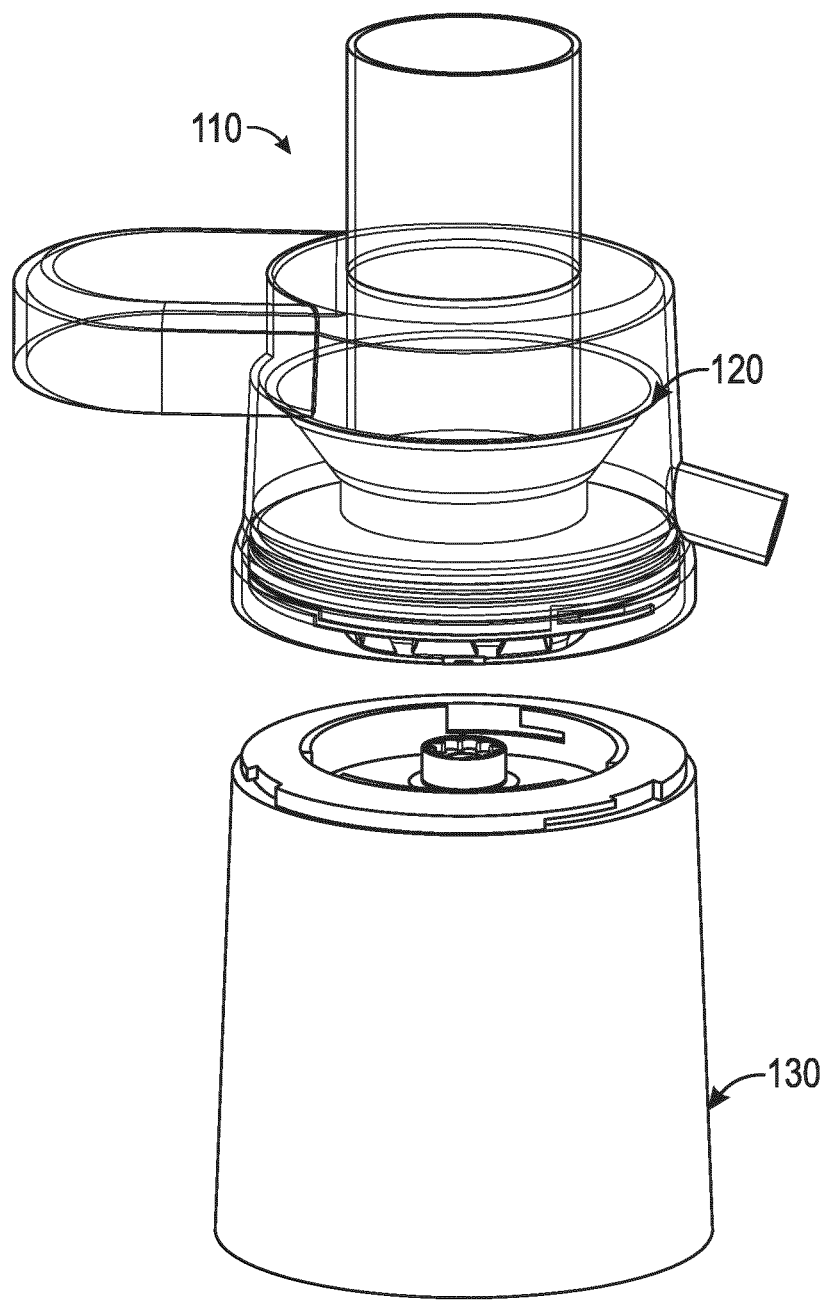
FIG. 24 is a front exploded assembly view of the engaged top and strainer sections proximate the motor housing prior to engagement of the engaged top and strainer sections to the motor housing, according to an exemplary embodiment.
Figure 25:
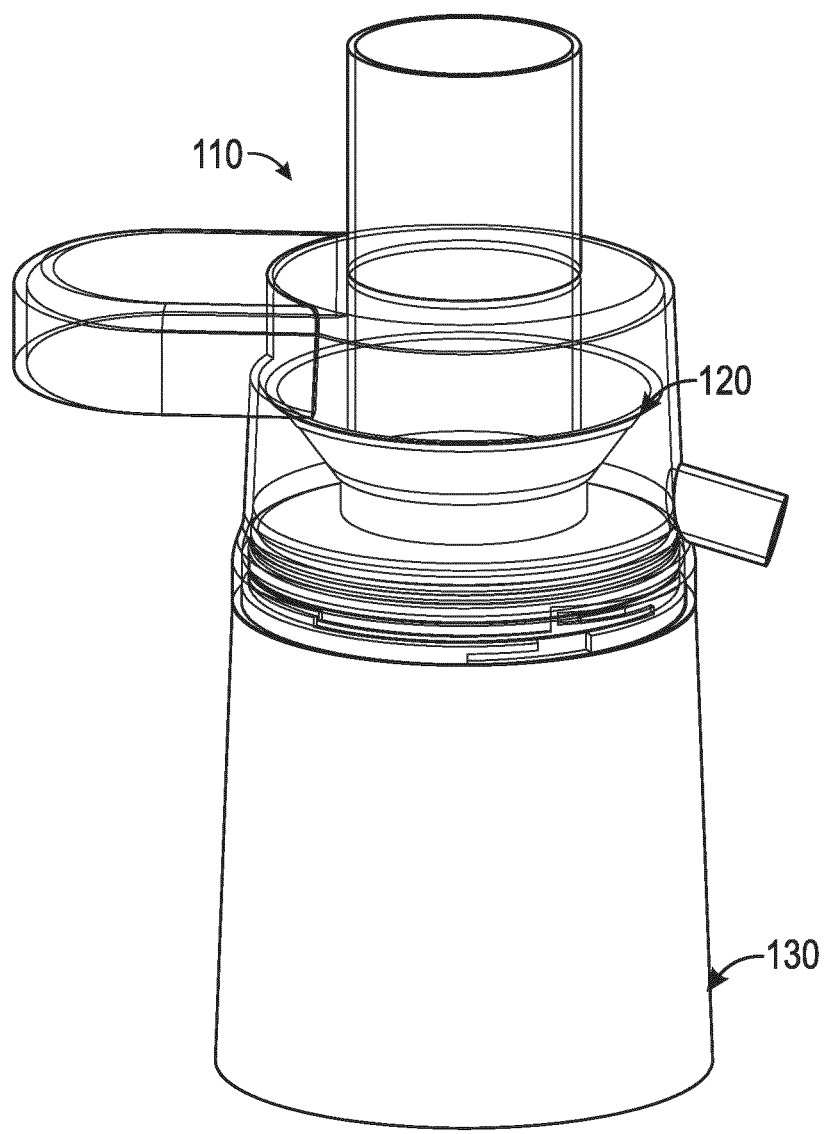
FIG. 25 is a front view of an assembled centrifugal juicer, according to an exemplary embodiment.
Figure 26:
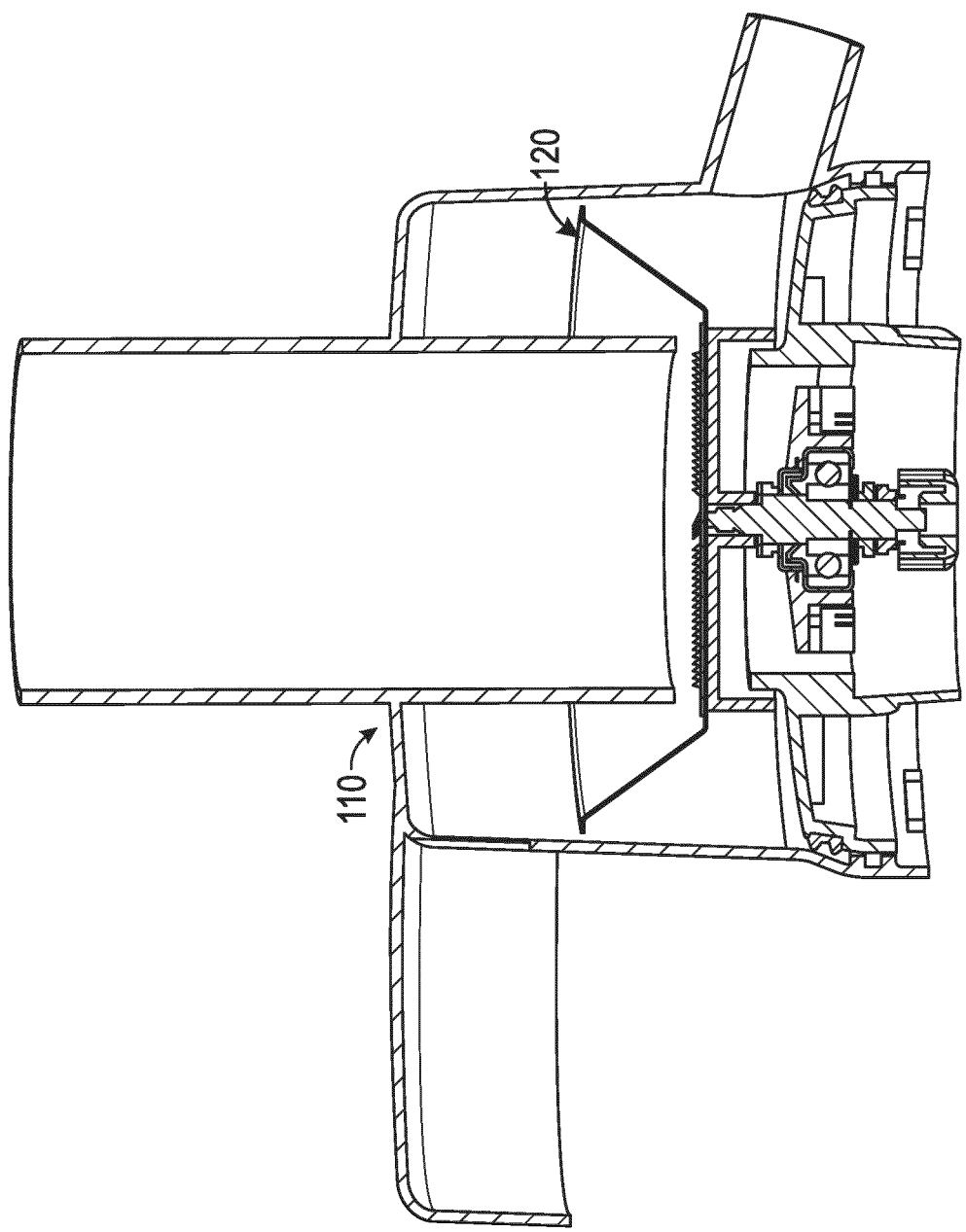
FIG. 26 is a front cross-sectional view of the strainer section engaged with the top section of a centrifugal juicer, according to an exemplary embodiment.
Figure 27:
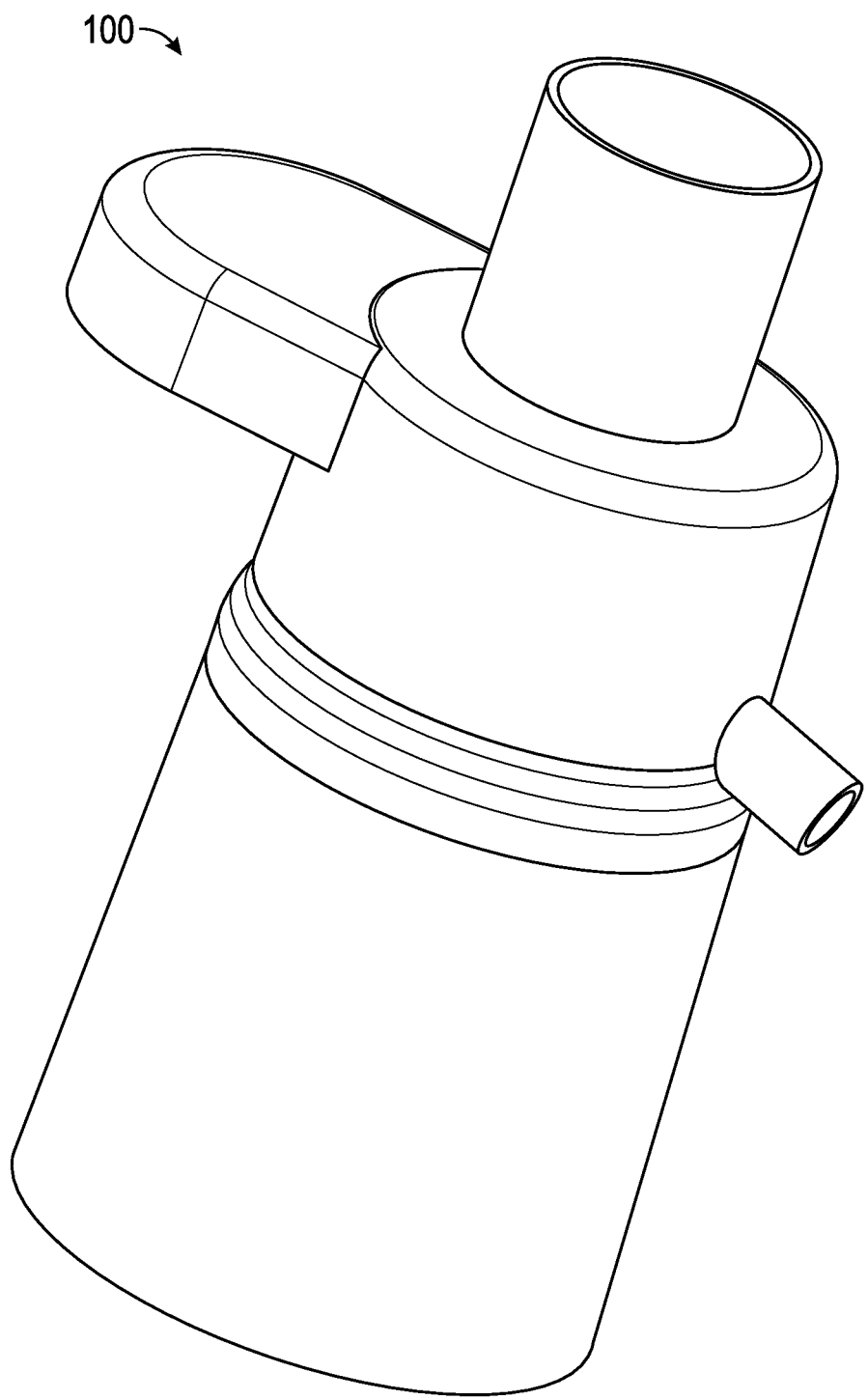
FIG. 27 is a top perspective view of the centrifugal juicer of FIG. 17, according to an exemplary embodiment.

FIGS. 24-25 depict step two of the assembly process: attach, couple, or mate the top section 110 and strainer section 120 assembly to the motor housing 130. FIG. 24 depicts the top section 110 and strainer section 120 assembly positioned longitudinally above the motor housing 130. To couple the top section 110 and strainer section 120 assembly to the motor housing 130, the motor adapter 162 (of the strainer section 120) is aligned and inserted into the drive member adapter 132. As mentioned above, in one embodiment the drive member adapter 132 (or, coupling, coupling structure, etc.) is directly attached to the motor 131 while, in other embodiments, the drive member adapter 132 is a part of the motor housing 130. Simultaneously or near simultaneously, the second ridge 117 of the housing 115 of the top section 110 is received in the groove 138 of the motor housing 130. The top section 110 is then rotated to latch the top and strainer sections 110, 120 to the motor housing 130 via engagement of the ridge 117 and the groove 138. As a result of the latch engagement between the top and strainer sections 110, 120 to the motor housing 130, the interlock device 133 is activated thereby making the centrifugal juicer 100 operational. A front view of the completely assembled centrifugal juicer 100 is shown in FIG. 25 while FIG. 27 depicts a top perspective view of the completely assembled centrifugal juicer 100. As mentioned above, the twist-latch engagement is only one type of attachment mechanism that may be used with the centrifugal juicer of the present disclosure. Other embodiments may use different types of attachment mechanisms, such as a snap-engagement, an interference type engagement, or simply placing the assembled top section and strainer section on the motor housing. Accordingly, the described assembly process is not meant to be limiting as many other processes may be used with such variations intended to fall within the present disclosure.

According to an alternate embodiment, the strainer section 120 may first be mated or coupled to the motor housing 130. As described herein, this may be done via groove 141 to a complementary projection on the juicer sieve housing 124 of the strainer section 120. However, many other types of coupling mechanism may also be used in place of or in addition to this mating feature. Furthermore, as mentioned above, this configuration refers to an assembly where each of the top section 110, strainer section 120, and motor housing 130 have two mating surfaces. Coupling the strainer section 120 to the motor housing may function to engage the drive member 160 with the coupling member (i.e., drive member adapter 132). Subsequently and lastly, the top section 110 may be mated with the coupled strainer section 120 and motor housing 130. According to one embodiment, mating the top section 110 to the coupled strainer section 120 and motor housing 130 activates an interlock device (e.g., interlock device 133) to permit power to the motor 131 in the motor housing 131. Accordingly, while the Figures and description herein is mainly directed to coupling the strainer section to the top section and then coupling to the motor housing, other variations of this process are possible that still fall within the spirit and scope of the present disclosure.

Therefore, and as described above, the centrifugal juicer of the present disclosure is operationally assembled in two steps which is a simplifying reduction relative to the steps required to assemble/operate and disassemble/clean conventional centrifugal juicers. This innovation integration of multiple features into a reduced set of component has the advantages of reducing complexity, reducing potential failure modes, improving ease of use and cleaning, and is intended to increase ease of use by users.

Beneficially, the easy assembly or relatively easy assembly characteristic of the centrifugal juicer of the present disclosure may accommodate or provide additional functionality relative to the centrifugal juicing functionality of the centrifugal juicer. In particular and in one embodiment, the centrifugal juicer may be converted into a blender. In this regard, a separate blender conversion kit may accompany the centrifugal juicer to facilitate and enable the conversion of the centrifugal juicer to a blender. The blender conversion kit may either include replacement components, components structured to attach to components of the centrifugal juicer, or a combination thereof.

Accordingly, in one embodiment of the blender conversion kit, the top section 110 may be replaced by a blender jar (e.g., container), the strainer section 120 may be replaced by a blender adapter (e.g., a blender component comprising one or more blades or other blending/cutting devices), and the pulp and juice containers 140, 150 may be removed. In one instance of this embodiment, the blender jar and blender adapter may be substantially permanently coupled together, such that coupling of the blender jar and blender adapter to the motor housing 130 may trigger the interlock switch to provide electrical power to the blender adapter to enable blending. In another instance of this embodiment, the blender jar and blender adapter may be separate components that may be selectively coupled or connected to each other and then attached to the motor housing 130 (or, vice versa, the blender adapter may be coupled to the motor housing 130 and then the blender jar coupled to the combined motor housing 130 and blender adapter). In this latter instance, the cutting member 125 may either remain the same like shown herein, or replaced with a different blending cutting member (e.g., projecting blades). Further, in one embodiment, the strainer 121 may be excluded from the section 120 to enable relatively easy coupling of the blender jar to the section 120, while in another embodiment, the strainer 121 may be included. In each configuration, the cutting member or blender adapter may be driven by the motor 131 in a rotary fashion using a selective coupling mechanism (e.g., the drive member adapter 160 shown herein) to enable blending. In operation, the blender jar may include a lid that may be removed by a user to enable insertion of one or more food and/or liquid products for blending (e.g., bananas, protein mix, strawberries, lettuce, orange juice, etc.).

In another embodiment, the centrifugal juicer may be converted into a citrus juicer through the use of a citrus juicer conversion kit. The citrus juicer may be utilized to extract juice from a food product (e.g., orange juice from an orange while separating out the pulp parts) for consumption. Similar to the blender conversion, the citrus juicer conversion kit may utilize one or more replacement components, components that selectively attach to one or more components of the centrifugal juicer, or a combination thereof.

Accordingly, in one embodiment, the top section 110 may be removed while the strainer section 120 may be either replaced with a dedicated citrus juicer attachment that may couple to the motor housing 130 to be selectively driven by the motor 131 to extract the juice, or certain components of the strainer section 120 may be removed and replaced with other components to form the citrus juicer attachment. For example, a citrus juicer attachment may be selectively coupled to the cutting member adapter 164 of the drive member 160. In this arrangement, the cutting member adapter 164 may be relatively longer or protruding above the cutting member 125 to enable additional coupling to the citrus juicer attachment. The citrus juicer attachment may include a rotatable blending portion (e.g., a frustoconical portion with ribs or protrusions that rotate to scrape the food product to squeeze or extract juice from the food product), a filter or strainer that receives the loose solid food parts (e.g., the pulp), and a catch for the extracted juice. The catch may be separate from the volume defined by the strainer 121 and cutting member 125 or may be the volume defined by the strainer 121 and the cutting member 125. In the latter configuration, relatively less space may be occupied due to the reduction in additional components. In either configuration and in operation, a user may press a food product (e.g., an orange) on the rotatable blending portion to cause rotation of the rotatable blending portion by the motor 131 to, in turn, extract juice from the food product.

As will be appreciated by those of ordinary skill in the art, the citrus juicer conversion kit and blender conversion kit may be readily performed based on the easy assembly characteristic of the centrifugal juicer through the replacement of one or more components/sections of the centrifugal juicer. It should be understood that the aforementioned example conversion processes are not meant to be limiting as the present disclosure contemplates a wide variety of conversion processes/kits, with all such processes/kits intended to fall within the scope of the present disclosure.

Beneficially, both of the citrus juicer and blender conversion kits may be packaged and sold with the centrifugal juicer of the present disclosure. In this regard, consumers may obtain a "three-in-one" unit. Further, due at least in part to the adaptability of the motor housing 130, motor 131, and drive member 160, the motor housing 130 may remain the same throughout each of the three configurations. In this regard, a user may only need to switch the centrifugal juicer parts (e.g., top section 110 and strainer section 120) for one of the citrus juicer conversion kits or the blender conversion kits. A three-in-one unit may be appealable to relatively more consumers due to the increased functionality of the unit. However, it should be understood that more or less conversion kits/attachments may also be implemented with the centrifugal juicer of the present disclosure to enable even more functionality than the aforementioned three functions, such that these example conversions are not meant to be limiting.

It should be noted that references to "front," "rear," "upper," "top," "bottom," "left," "right," and "lower" in this description are merely used to identify the various elements as they are oriented in the Figures, with "top" and "bottom" being indicating the relative positioning of one or more components (e.g., the top section is placed on top of the motor housing). These terms are not meant to limit the element which they describe.

Further, for purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It is important to note that the construction and arrangement of the elements of centrifugal juicer 100 provided herein are illustrative only. Although only a few exemplary embodiments of the present innovations have been described in detail in this disclosure, those skilled in the art who review this disclosure will readily appreciate that many modifications are possible in these embodiments (e.g., the inclusion of an integrated pulp container, various configurations for the cutting member, various shapes and sizes of the components (e.g., a cylindrical strainer), etc.) without materially departing from the novel teachings and advantages of the inventions. Accordingly, all such modifications are intended to be within the scope of the inventions.

Furthermore, the order or sequence of any process or method steps may be varied or re-sequenced according to alternative embodiments. Other substitutions, modifications, changes and omissions may be made in the design, operating configuration and arrangement of the preferred and other exemplary embodiments without departing from the spirit of the present disclosure as expressed herein and in the appended claims.

What is claimed is:

1. A method of providing of a centrifugal juicer, comprising:
   providing a top section of a centrifugal juicer, the top section defining an opening for a cavity of the top section, the opening proximate to a bottom of the top section, wherein the top section includes a first mating surface and a second mating surface that are each positioned near the opening and within the cavity, wherein the second mating surface is positioned below the first mating surface such that the second mating surface is closer to the opening than the first mating surface;
   providing a strainer section of the centrifugal juicer, the strainer section having a mating feature structured to selectively mate with the first mating surface to couple the strainer section to the top section; and
   providing a motor housing for a motor of the centrifugal juicer, wherein the second mating surface engages with the motor housing to couple the top section to the motor housing.

2. The method of claim 1, wherein each of the top section, strainer section, and motor housing are provided as single piece components.

3. The method of claim 1, wherein the motor housing includes a switch structured to selectively permit and prohibit power to the motor in the motor housing.

4. The method of claim 3, wherein mating a coupled top section and strainer section with the motor housing activates the switch to permit power to the motor.

5. The method of claim 1, wherein the first mating surface of the top section includes a ridge, wherein the mating feature of the strainer section includes a projection, and wherein the ridge and projection are structured to rotatably engage to couple the top section to the strainer section.

6. The method of claim 1, wherein the strainer section includes at least one projection, wherein the motor housing or motor includes at least one groove, and wherein the at least one groove is structured to receive the at least one projection to selectively engage with the strainer section.

7. The method of claim 1, wherein the top section includes a juice spout and a pulp exit, and wherein the juice spout is structured to guide extracted juice from the centrifugal juicer and the pulp exit is structured to provide pulp from the centrifugal juicer.

8. A method of assembling a centrifugal juicer, comprising:
   providing a top section, a strainer section having a mating feature, and a motor housing for housing a motor of the centrifugal juicer, the top section defining an opening for a cavity of the top section, wherein the top section includes a first mating surface and a second mating surface that are each positioned near the opening and within the cavity, wherein the second mating surface is positioned below the first mating surface such that the second mating surface is closer to the opening than the first mating surface;
   performing one of: inserting the strainer section into the opening of the cavity defined by the top section, or coupling the strainer section with the motor housing;
   wherein the insertion process includes:
      mating the first mating surface with the mating feature of the strainer section to couple the top section to the strainer section; and
      mating the coupled top section and strainer section with the motor housing via the second mating surface to form the centrifugal juicer; and
   wherein the coupling process includes mating the second mating surface of the top section with the coupled strainer section and motor housing to form the centrifugal juicer.

9. The method of claim 8, wherein each of the strainer section and motor housing includes two mating surfaces.

10. The method of claim 8, wherein the first mating surface of the top section includes a ridge, wherein the mating feature of the strainer section includes a projection, and wherein mating the first mating surface with the mating feature of the strainer section includes rotatably engaging the projection with the ridge to couple the top section to the strainer section.

11. The method of claim 8, wherein the strainer section includes at least one projection, wherein the motor housing or motor includes at least one groove, and wherein the at least one groove is structured to receive the at least one projection to selectively engage with the strainer section.

12. The method of claim 8, wherein the top section includes a juice spout and a pulp exit, and wherein the juice spout is structured to guide extracted juice from the centrifugal juicer and the pulp exit is structured to provide pulp from the centrifugal juicer.

* * * * *